US009313498B2

(12) United States Patent
Sole Rojals et al.

(10) Patent No.: US 9,313,498 B2
(45) Date of Patent: Apr. 12, 2016

(54) SIGN HIDING TECHNIQUES FOR QUANTIZED TRANSFORM COEFFICIENTS IN VIDEO CODING

(71) Applicant: QUALCOMM Incorporated, San Diego, CA (US)

(72) Inventors: Joel Sole Rojals, La Jolla, CA (US); Jianle Chen, San Diego, CA (US); Wei-Jung Chien, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 409 days.

(21) Appl. No.: 13/863,160

(22) Filed: Apr. 15, 2013

(65) Prior Publication Data

US 2013/0272424 A1   Oct. 17, 2013

Related U.S. Application Data

(60) Provisional application No. 61/625,025, filed on Apr. 16, 2012, provisional application No. 61/665,788, filed on Jun. 28, 2012.

(51) Int. Cl.
*H04N 19/61* (2014.01)
*H04N 19/129* (2014.01)
*H04N 19/18* (2014.01)

(52) U.S. Cl.
CPC ....... *H04N 19/00781* (2013.01); *H04N 19/129* (2014.11); *H04N 19/18* (2014.11); *H04N 19/61* (2014.11)

(58) Field of Classification Search
None
See application file for complete search history.

(56) References Cited

U.S. PATENT DOCUMENTS

| 7,706,566 | B2 | 4/2010 | Shi et al. |
| 8,254,443 | B2 | 8/2012 | Dencher |
| 2004/0228403 | A1 | 11/2004 | Yu |
| 2009/0257501 | A1 | 10/2009 | Ye et al. |
| 2010/0020869 | A1 | 1/2010 | Ikeda |
| 2011/0096832 | A1 | 4/2011 | Zhang et al. |
| 2011/0286525 | A1 | 11/2011 | Kamisli et al. |

(Continued)

FOREIGN PATENT DOCUMENTS

WO    2011128268 A1    10/2011

OTHER PUBLICATIONS

Clare et al., "Sign Data Hiding," JCTVC-G271, Nov. 2011.*

(Continued)

*Primary Examiner* — William C Vaughn, Jr.
*Assistant Examiner* — Michael J Hess
(74) *Attorney, Agent, or Firm* — Shumaker & Sieffert, P.A.

(57) ABSTRACT

This disclosure proposes techniques for encoding and decoding transform coefficients in a video coding process. In particular, this disclosure proposes techniques determining whether or not to apply a sign data hiding process for a group of transform coefficients, and techniques for applying the sign data hiding process. In one example, this disclosure describes a method for decoding video data comprising determining a block of transform coefficients, determining whether to perform a sign data hiding process for at least one transform coefficient in the block of transform coefficients based on a single variable compared to a threshold, and decoding sign information for the block based on the determination of whether to perform the sign data hiding process.

39 Claims, 10 Drawing Sheets

(56) References Cited

U.S. PATENT DOCUMENTS

| | | | |
|---|---|---|---|
| 2012/0082233 A1 | 4/2012 | Sze et al. | |
| 2012/0163471 A1 | 6/2012 | Karczewicz et al. | |
| 2012/0177103 A1 | 7/2012 | Fu et al. | |
| 2012/0230422 A1 | 9/2012 | Korodi et al. | |
| 2013/0003834 A1 | 1/2013 | Rojals et al. | |
| 2013/0188725 A1* | 7/2013 | Wang et al. | 375/240.18 |
| 2014/0003530 A1 | 1/2014 | Sole Rojals | |

OTHER PUBLICATIONS

Hadar, O. et al., "Rate Distortion Optimization for Efficient Watermarking in the DCT Domain," 2008 IEEE International Symposium on Broadband Multimedia Systems and Broadcasting, Piscataway, NJ, USA, Mar. 31, 2008, pp. 1-8.*

Alshin et al., "Multi-parameter probability up-date for CABAC," Joint Collaborative Team on Video Coding (JCT-VC) of ITU-T SG16 WP3 and ISO/IEC JTC1/SC29/WG11 6th Meeting: Torino, IT, Jul. 14-22, 2011, JCTVC-F254, 5 pp.

Amonou et al., "Description of video coding technology proposal by France Telecom, NTT, NTT DOCOMO, Panasonic and Technicolor," ITU-T SG16 WP3 and ISO/IEC JTCI/SC29/WG11, Document JCTVC-A114, 1st Meeting, Dresden, DE, Apr. 15-23, 2010, 42 pp.

Auyeung "Cross-check of JCTVC-J0099 on sign data hiding simplification," JCT-VC Meeting; MPEG Meeting; Jul. 11, 2012-Jul. 20, 2012; Stockholm, SE; (Joint Collaborative Team on Video Coding of ITU-T SG16 WP3 and ISO/IEC JTCI/SC29/WG11), URL: http://wftp3.itu.int/av-arch/jctvc-site/, No. JCTVC-J0377, XP030112739, 3 pp.

Bross et al., "High Efficiency Video Coding (HEVC) text specification draft 10 (for FDIS & Last Call)," 12th Meeting: Geneva, CH, Jan. 14-23, 2013, JCTVC-L1003_v34, 310 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High Efficiency Video Coding (HEVC) text specification draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, CH, Nov. 21-30, 2011, JCTVC-G1103_d2, 214 pp.

Clare et al., "CE11: Sign Data Hiding", 8. JCT-VC Meeting; 99. MPEG Meeting; Feb. 1-10, 2012, San Jose, CA; (Joint Collaborative Team on Video Coding of ITU-T SG16 WP3 and ISO/IEC JTCI/SC29/WG11), Document: JCTVC-H0224, XP030111251, 10 pp.

Clare et al., "Non-CE11: Sign Data Hiding without RDOQ ", JCT-VC Meeting; MPEG Meeting; Feb. 1-10, 2012; San Jose, CA; (Joint Collaborative Team on Video Coding of ITU-T SG16 WP3 and ISO/IEC JTCI/SC29/WG11), Document: JCTVC-H0227; XP030111254, 10 pp.

Clare et al., "Sign Data Hiding", MPEG Meeting; Nov. 21-30, 2011; Geneva, CH (Motion Picture Expert Group or ISO/IEC JTC1/SC29/WG11), No. m21833, Document: JCTVC-G271; 10 pp.

International Search Report and Written Opinion—PCT/US2013/036766—ISA/EPO—Aug. 2, 2013, 13 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Marpe et al., "Context-Based Adaptive Binary Arithmetic Coding in the H.264/AVC Video Compression Standard," IEEE Transactions on Circuits and Systems for Video Technology, Jul. 2003, vol. 13 (7), pp. 620-636.

Sole et al., "Sign data hiding flag for chroma," JCT-VC Meeting; MPEG Meeting; Jan. 14-23, 2013, Geneva, CH; (Joint Collaborative Team on Video Coding of ITU-T SG16 WP3 and ISO/IEC JTCI/SC29/WG11), URL: htip://wftp3.1tu.int/av-arch/jctvc-site/, No. JCTVC-L0202, XP030113690, 5 pp.

Wiegand et al., "WD1: Working Draft 1 of High-Efficiency Video Coding," JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Yu et al., "Multiple Sign Bits Hiding," 8th Meeting, San Jose, CA, Feb. 1-10, 2012, Document JCTVC-H0481, 8 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2014, 317 pp.

Li Y., et al., "A New Method of Data Hiding Based on H.264 Encoded Video Sequences", IEEE 10th International Conference on Signal Processing, 2010, pp. 1833-1836.

Thiesse J.M., et al., "Data Hiding of Intra Prediction Information in Chroma Samples for Video Compression", IEEE 17th International Conference on Image Processing (ICIP), 2010, pp. 2861-2864.

* cited by examiner

SIGN HIDING TECHNIQUES FOR QUANTIZED TRANSFORM COEFFICIENTS IN VIDEO CODING

This application claims the benefit of U.S. Provisional Application No. 61/625,025, filed Apr. 16, 2012, and U.S. Provisional Application No. 61/665,788, filed Jun. 28, 2012, the entire content of both of which are hereby incorporated by reference in their entirety.

TECHNICAL FIELD

This disclosure relates to video coding, and more particularly to techniques for coding transform coefficients.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques include spatial prediction and/or temporal prediction to reduce or remove redundancy inherent in video sequences. For block-based video coding, a video frame or slice may be partitioned into blocks. A video frame alternatively may be referred to as a picture. Each block can be further partitioned. Blocks in an intra-coded (I) frame or slice are encoded using spatial prediction with respect to reference samples in neighboring blocks in the same frame or slice. Blocks in an inter-coded (P or B) frame or slice may use spatial prediction with respect to reference samples in neighboring blocks in the same frame or slice or temporal prediction with respect to reference samples in other reference frames. Spatial or temporal prediction results in a predictive block for a block to be coded. Residual data represents pixel differences between the original block to be coded, i.e., the coded block, and the predictive block.

An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in a particular order to produce a one-dimensional vector of transform coefficients for entropy coding.

SUMMARY

In general, this disclosure describes techniques for coding video data. In particular, this disclosure describes techniques for coding sign data relating to transform coefficients associated with residual video data in a video coding process.

This disclosure proposes techniques for encoding and decoding transform coefficients in a video coding process. In particular, this disclosure proposes techniques determining whether or not to apply a sign data hiding process for a group of transform coefficients, and techniques for applying the sign data hiding process.

In one example, this disclosure describes a method for decoding video data comprising determining a block of transform coefficients, determining whether to perform a sign data hiding process for at least one transform coefficient in the block of transform coefficients based on a single variable compared to a threshold, and decoding sign information for the block based on the determination of whether to perform the sign data hiding process.

In another example, this disclosure describes, a method for encoding video data comprising determining a block of transform coefficients, determining whether to perform a sign data hiding process for at least one transform coefficient in the block of transform coefficients based on a single variable compared to a threshold, and encoding sign information for the block based on the determination of whether to perform the sign data hiding process.

This disclosure also describes a video encoder, a video decoder, apparatuses, and computer-readable mediums storing instructions that may be configured to perform the techniques for signaling transform coefficients described herein.

The details of one or more examples are set forth in the accompanying drawings and the description below. Other features, objects, and advantages will be apparent from the description and drawings, and from the claims.

DETAILED DESCRIPTION

In general, this disclosure describes techniques for coding video data. In particular, this disclosure describes techniques for coding sign data of transform coefficients in a video encoding and/or decoding process.

As will be discussed in more detail below, the coding of transform coefficient may include separately coding both the absolute value of the transform coefficient and the sign of the transform coefficient (i.e., plus or minus). As coding sign data represents a large amount of the coded bitstream, techniques to "hide" the value of the sign for some transform coefficients within other signaled data has been developed. One such technique is called sign data hiding (SDH).

SDH is a new technique that has not been refined. As such, several initial drawbacks have been observed. First, the criteria used to determine whether to use the SDH process is the distance in scanning order between the first and the last significant coefficient in a coefficient group (CG). This requires storing two variables to make the decision, and adds complexity to a video encoder and video decoder. Additionally, current proposals for SDH only specify hiding one sign per CG, thus limiting potential benefits. In view of these drawbacks, this disclosure proposes techniques to improve several features of SDH, especially with regard to a performance/complexity trade-off.

Figure 1:
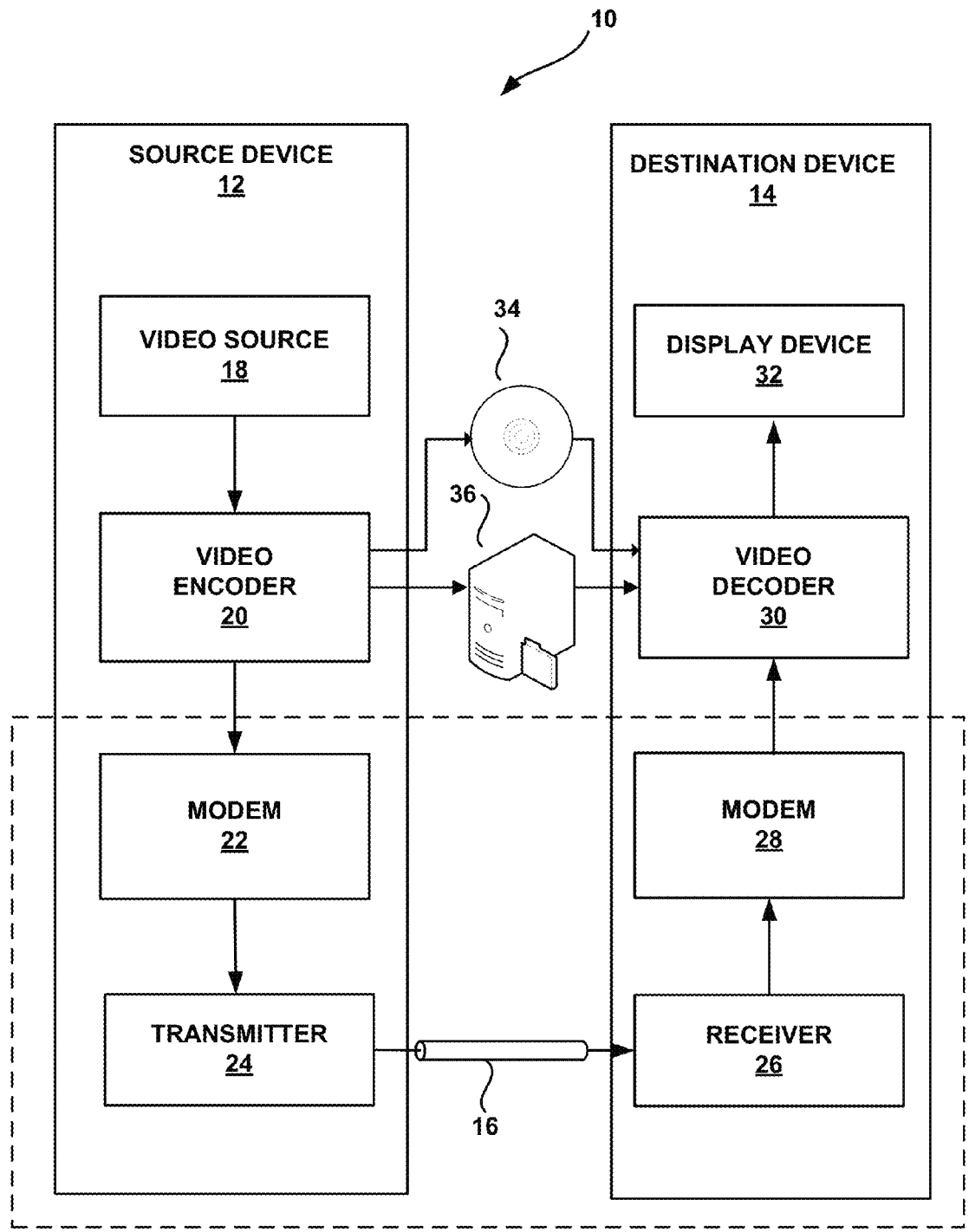
FIG. 1 is a block diagram illustrating an example video encoding and decoding system.

FIG. 1 is a block diagram illustrating an example video encoding and decoding system 10 that may be configured to utilize the techniques for coding sign data of transform coefficients in accordance with examples of this disclosure. As shown in FIG. 1, system 10 includes source device 12 that transmits encoded video to destination device 14 via communication channel 16. Encoded video data may also be stored on storage medium 34 or file server 36 and may be accessed by destination device 14 as desired. When stored to a storage medium or file server, video encoder 20 may provide coded video data to another device, such as a network interface, a compact disc (CD), Blu-ray or digital video disc (DVD) burner or stamping facility device, or other devices, for storing the coded video data to the storage medium. Likewise, a device separate from video decoder 30, such as a network interface, CD or DVD reader, or the like, may retrieve coded video data from a storage medium and provided the retrieved data to video decoder 30.

Source device 12 and destination device 14 may comprise any of a wide variety of devices, including desktop computers, notebook (i.e., laptop) computers, tablet computers, set-top boxes, telephone handsets such as so-called smartphones, televisions, cameras, display devices, digital media players, video gaming consoles, or the like. In many cases, such devices may be equipped for wireless communication. Hence, communication channel 16 may comprise a wireless channel, a wired channel, or a combination of wireless and wired channels suitable for transmission of encoded video data. Similarly, file server 36 may be accessed by destination device 14 through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server.

Techniques for coding sign data of transform coefficients, in accordance with examples of this disclosure, may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, modulator/demodulator 22 and transmitter 24. In source device 12, video source 18 may include a source such as a video capture device, such as a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones, which may be provided, e.g., within smartphones or tablet computers. However, the techniques described in this disclosure may be applicable to video coding in general, and may be applied to wireless and/or wired applications, or application in which encoded video data is stored on a local disk.

The captured, pre-captured, or computer-generated video may be encoded by video encoder 20. The encoded video information may be modulated by modem 22 according to a communication standard, such as a wired or wireless communication protocol, and transmitted to destination device 14 via transmitter 24. Modem 22 may include various mixers, filters, amplifiers or other components designed for signal modulation. Transmitter 24 may include circuits designed for transmitting data, including amplifiers, filters, and, in the case of wireless communication, one or more antennas.

The captured, pre-captured, or computer-generated video that is encoded by video encoder 20 may also be stored onto storage medium 34 or file server 36 for later consumption. Storage medium 34 may include Blu-ray discs, DVDs, CD-ROMs, flash memory, or any other suitable digital storage media for storing encoded video. The encoded video stored on the storage medium 34 may then be accessed by destination device 14 for decoding and playback. Although not shown in FIG. 1, in some examples, storage medium 34 and/or file server 36 may store the output of transmitter 24.

File server 36 may be any type of server capable of storing encoded video and transmitting that encoded video to destination device 14. Example file servers include a web server (e.g., for a website), an FTP server, network attached storage (NAS) devices, a local disk drive, or any other type of device capable of storing encoded video data and transmitting it to a destination device. The transmission of encoded video data from file server 36 may be a streaming transmission, a download transmission, or a combination of both. File server 36 may be accessed by destination device 14 through any standard data connection, including an Internet connection. This may include a wireless channel (e.g., a Wi-Fi connection), a wired connection (e.g., DSL, cable modem, Ethernet, USB, etc.), or a combination of both that is suitable for accessing encoded video data stored on a file server.

Destination device 14, in the example of FIG. 1, includes receiver 26, modem 28, video decoder 30, and display device 32. Receiver 26 of destination device 14 receives information over channel 16, and modem 28 demodulates the information to produce a demodulated bitstream for video decoder 30. The information communicated over channel 16 may include a variety of syntax information generated by video encoder 20 for use by video decoder 30 in decoding video data. Such syntax may also be included with the encoded video data stored on storage medium 34 or file server 36. Each of video encoder 20 and video decoder 30 may form part of a respective encoder-decoder (CODEC) that is capable of encoding or decoding video data.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

Video encoder 20 and video decoder 30 may operate according to a video compression standard, such as the High Efficiency Video Coding (HEVC) standard presently under development by the Joint Collaboration Team on Video Coding (JCT-VC) of ITU-T Video Coding Experts Group (VCEG) and ISO/IEC Motion Picture Experts Group (MPEG). A recent draft of the HEVC standard, referred to as "HEVC Working Draft 9" or "WD9," is described in document JCTVC-K1003v13, Bross et al., "High efficiency video coding (HEVC) text specification draft 9," Joint Collaborative Team on Video Coding (JCT-VC) of ITU-T SG16 WP3 and ISO/IEC JTC1/SC29/WG11, 11th Meeting: Shanghai, Conn., 10-19 Oct., 2012, which, as of Mar. 19, 2013, is downloadable from http://phenix.int-evry.fr/jct/doc_end_user/documents/11_Shanghai/wg11/JCTVC-K1003-v13.zip. The entire content of HEVC WD9 is hereby incorporated herein by reference.

Alternatively, video encoder 20 and video decoder 30 may operate according to other proprietary or industry standards, such as the ITU-T H.264 standard, alternatively referred to as MPEG 4, Part 10, Advanced Video Coding (AVC), or extensions of such standards. The techniques of this disclosure, however, are not limited to any particular coding standard. Other examples include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Video encoder 20 may implement any or all of the techniques of this disclosure for coding transform coefficients in a video coding process. Likewise, video decoder 30 may implement any or all of these techniques for coding transform coefficients in a video coding process. A video coder, as described in this disclosure, may refer to a video encoder or a video decoder. Similarly, a video coding unit may refer to a video encoder or a video decoder. Likewise, video coding may refer to video encoding or video decoding.

In one example of the disclosure, as will be explained in more detail below, video encoder 20 may be configured to determine a block of transform coefficients, determine whether to perform a sign data hiding process for at least one transform coefficient in the block of transform coefficients based on a single variable compared to a threshold, and encode sign information for the block based on the determination of whether to perform the sign data hiding process.

Likewise, video decoder 30 may be configured to determine a block of transform coefficients, determine whether to perform a sign data hiding process for at least one transform coefficient in the block of transform coefficients based on a single variable compared to a threshold, and decode sign information for the block based on the determination of whether to perform the sign data hiding process.

Digital video devices implement video compression techniques to encode and decode digital video information more efficiently. Video compression may apply spatial (intra-frame) prediction and/or temporal (inter-frame) prediction techniques to reduce or remove redundancy inherent in video sequences.

The JCT-VC is working on development of the HEVC standard, e.g., as described in the HEVC WD9 discussed above. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes. The following section will discuss certain aspects of the HM in more detail.

For video coding according to the HEVC standard currently under development, a video frame may be partitioned into coding units. A coding unit (CU) generally refers to an image region that serves as a basic unit to which various coding tools are applied for video compression. A CU usually has a luminance component, denoted as Y, and two chroma components, denoted as U and V. Depending on the video sampling format, the size of the U and V components, in terms of number of samples, may be the same as or different from the size of the Y component.

A CU is typically square, and may be considered to be similar to a so-called macroblock, e.g., under other video coding standards such as ITU-T H.264. Coding according to some of the presently proposed aspects of the developing HEVC standard will be described in this application for purposes of illustration. However, the techniques described in this disclosure may be useful for other video coding processes, such as those defined according to H.264 or other standard or proprietary video coding processes.

According to the HM, a CU may include one or more prediction units (PUs) and/or one or more transform units (TUs). Syntax data within a bitstream may define a largest coding unit (LCU), which is a largest CU in terms of the number of pixels. In general, a CU has a similar purpose to a macroblock of H.264, except that a CU does not have a size distinction. Thus, a CU may be split into sub-CUs. In general, references in this disclosure to a CU may refer to a largest coding unit of a picture or a sub-CU of an LCU. An LCU may be split into sub-CUs, and each sub-CU may be further split into sub-CUs. Syntax data for a bitstream may define a maximum number of times an LCU may be split, referred to as CU depth. Accordingly, a bitstream may also define a smallest coding unit (SCU). This disclosure also uses the term "block" or "portion" to refer to any of a CU, PU, or TU. In general, "portion" may refer to any sub-set of a video frame.

An LCU may be associated with a quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, 4 sub-CUs of a leaf-CU will also be referred to as leaf-CUs although there is no explicit splitting of the original leaf-CU. For example if a CU at 16×16 size is not split further, the four 8×8 sub-CUs will also be referred to as leaf-CUs although the 16×16 CU was never split.

A leaf-CU may include one or more prediction units (PUs). In general, a PU represents all or a portion of the corresponding CU, and may include data for retrieving a reference sample for the PU. For example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. Data for the leaf-CU defining the PU(s) may also describe, for example, partitioning of the CU into one or more PUs. Partitioning modes may differ depending on whether the CU is uncoded, intra-prediction mode encoded, or inter-prediction mode encoded. For intra coding, a PU may be treated the same as a leaf transform unit described below.

The emerging HEVC standard allows for transformations according to transform units (TUs), which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized. A TU includes a luma transform block and two chroma transform blocks. As such, any coding process discussed below that is applied to a TU, may be, in actuality, applied to the luma and chroma transform blocks.

In general, a PU refers to data related to the prediction process. For example, when the PU is intra-mode encoded, the PU may include data describing an intra-prediction mode for the PU. As another example, when the PU is inter-mode encoded, the PU may include data defining a motion vector for the PU.

In general, a TU is used for the transform and quantization processes. A given CU having one or more PUs may also include one or more transform units (TUs). Following prediction, video encoder 20 may calculate residual values from the video block identified by the coding node in accordance with the PU. The coding node is then updated to reference the residual values rather than the original video block. The residual values comprise pixel difference values that may be transformed into transform coefficients, quantized, and scanned using the transforms and other transform information specified in the TUs to produce serialized transform coefficients for entropy coding. The coding node may once again be updated to refer to these serialized transform coefficients. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

To code a block (e.g., a prediction unit of video data), a predictor for the block is first derived. The predictor, also referred to as a predictive block, can be derived either through intra (I) prediction (i.e., spatial prediction) or inter (P or B) prediction (i.e. temporal prediction). Hence, some prediction units may be intra-coded (I) using spatial prediction with respect to reference samples in neighboring reference blocks in the same frame (or slice), and other prediction units may be uni-directionally inter-coded (P) or bi-directionally inter-coded (B) with respect to blocks of reference samples in other previously-coded frames (or slices). In each case, the reference samples may be used to form a predictive block for a block to be coded.

Upon identification of a predictive block, the difference between the pixels in the original video data block and the pixels in its predictive block is determined. This difference may be referred to as the prediction residual data, and indicates the pixel differences between the pixel values in the block to the coded and the pixel values in the predictive block selected to represent the coded block. To achieve better compression, the prediction residual data may be transformed, e.g., using a discrete cosine transform (DCT), an integer transform, a Karhunen-Loeve (K-L) transform, or another transform to produce transform coefficients.

The residual data in a transform block may be arranged in a two-dimensional (2D) array of pixel difference values residing in the spatial, pixel domain. A transform converts the residual pixel values into a two-dimensional array of transform coefficients in a transform domain, such as a frequency domain.

For further compression, the transform coefficients may be quantized prior to entropy coding. An entropy coder then applies entropy coding, such as Context Adaptive Variable Length Coding (CAVLC), Context Adaptive Binary Arithmetic Coding (CABAC), Probability Interval Partitioning Entropy Coding (PIPE), or the like, to the quantized transform coefficients. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, Video encoder 20 may also entropy encode syntax elements associated with the encoded video data for use by video decoder 30 in decoding the video data.

This disclosure is related techniques for context adaptive binary arithmetic coding (CABAC) entropy coders or other entropy coders, such as probability interval partitioning entropy coding (PIPE) or related coders. Arithmetic coding is a form of entropy coding used in many compression algorithms that have high coding efficiency, because it is capable of mapping symbols to non-integer length codewords. An example of an arithmetic coding algorithm is Context Based Binary Arithmetic Coding (CABAC) used in H.264/AVC.

In general, entropy coding data symbols using CABAC involves one or more of the following steps:

(1) Binarization: If a symbol to be coded is non-binary valued, it is mapped to a sequence of so-called "bins." Each bin can have a value of "0" or "1."

(2) Context Assignment: Each bin (in regular mode) is assigned to a context. A context model determines how a context for a given bin is calculated based on information available for the bin, such as values of previously encoded symbols or bin number.

(3) Bin encoding: Bins are encoded with an arithmetic encoder. To encode a bin, the arithmetic encoder requires as an input a probability of the bin's value, i.e., a probability that the bin's value is equal to "0," and a probability that the bin's value is equal to "1." The (estimated) probability of each context is represented by an integer value called a "context state." Each context has a range of states, and thus the range of states (i.e., estimated probabilities) is the same for bins assigned to one context, and differs between contexts.

(4) State update: The probability (state) for a selected context is updated based on the actual coded value of the bin (e.g., if the bin value was "1," the probability of "1's" is increased).

It should be noted that probability interval partitioning entropy coding (PIPE) uses principles similar to those of arithmetic coding, and can thus also utilize the techniques of this disclosure.

CABAC in H.264/AVC and HEVC uses states, and each state is implicitly related to a probability. There are variants of CABAC, in which a probability of a symbol ("0" or "1") is used directly, i.e., the probability (or an integer version of it) is the state. For example, some variants of CABAC are described in "Description of video coding technology proposal by France Telecom, NTT, NTT DOCOMO, Panasonic and Technicolor," JCTVC-A114, 1$^{st}$ JCT-VC Meeting, Dresden, Del., April 2010, referred to as "JCTVC-A114" hereinafter, and A. Alshin and E. Alshina, "Multi-parameter probability update for CABAC," JCTVC-F254, 6$^{th}$ JCT-VC Meeting, Torino, IT, July 2011, referred to as "JCTVC-F254" hereinafter.

To entropy code a block of quantized transform coefficients, a scanning process is usually performed so that the two-dimensional (2D) array of quantized transform coefficients in a block is rearranged, according to a particular scan order, into an ordered, one-dimensional (1D) array, i.e., vector, of transform coefficients. Entropy coding is then applied to the vector of transform coefficients. The scan of the quantized transform coefficients in a transform unit serializes the 2D array of transform coefficients for the entropy coder. A significance map may be generated to indicate the positions of significant (i.e., non-zero) coefficients. Scanning may be applied to scan levels of significant (i.e., nonzero) coefficients, and/or to code signs of the significant coefficients.

In the HEVC standard, position information of the significant transform (e.g., the significance map) is first coded for a transform block to indicate the location of the last non-zero coefficient in the scan order. The significance map and the level information (the absolute values and signs of the coefficients) are coded for each coefficient in an inverse scan order.

Figure 2:
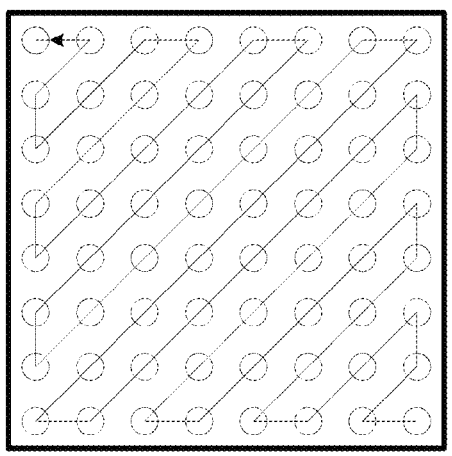
FIG. 2 is a conceptual drawing showing example inverse scan orders for transform coefficient coding.
Figure 2:
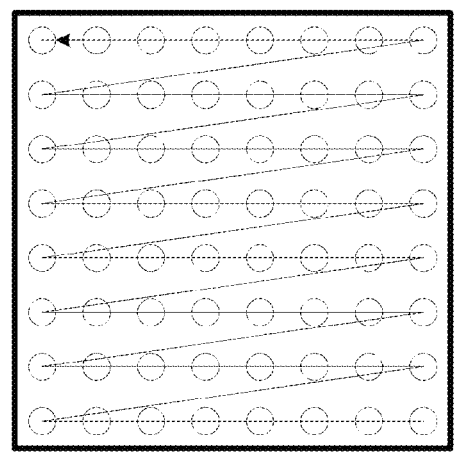
Figure 2:
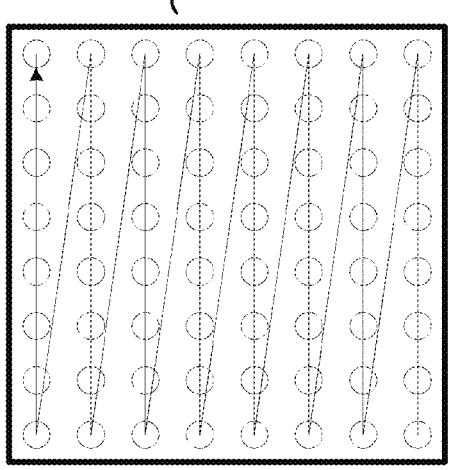
Figure 2:
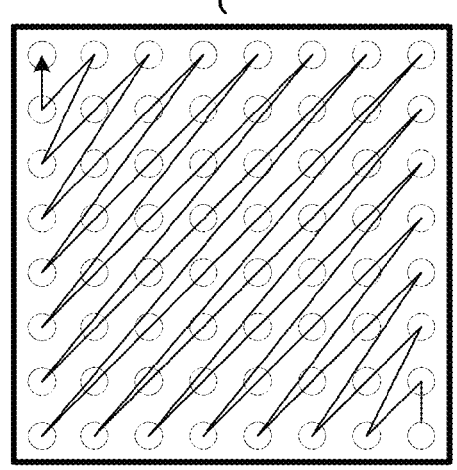

Currently, there are three different scans in HEVC: a subblock diagonal scan, a subblock horizontal scan, and a subblock vertical scan. FIG. 2 shows examples of inverse scan orders for a block of transform coefficients. Note that each of the inverse diagonal pattern 35, inverse zig-zag pattern 29, inverse vertical pattern 31, and the inverse horizontal pattern 33 proceeds from the higher frequency coefficients in the lower right corner of the transform block to lower frequency coefficients in the upper left corner of the transform block.

The subblock diagonal scan, subblock horizontal scan, and subblock vertical scan are applied for 4×4 and 8×8 transform blocks. The subblock based diagonal scan is employed in 16×16 and 32×32 transform blocks in the current HEVC test model. In some examples, the subblock based diagonal scan could also be applied to an 8×8 TU. In a subblock based scan, one 4×4 subblock of a larger transform block is scanned before proceeding to another 4×4 subblock within the larger transform block. In other examples, a "subblock" may consist of a number of consecutively scanned coefficients according to the scan order used. For example, the "subblock" may consist of 16 consecutively scanned coefficients along a diagonal scan order.

Figure 3:
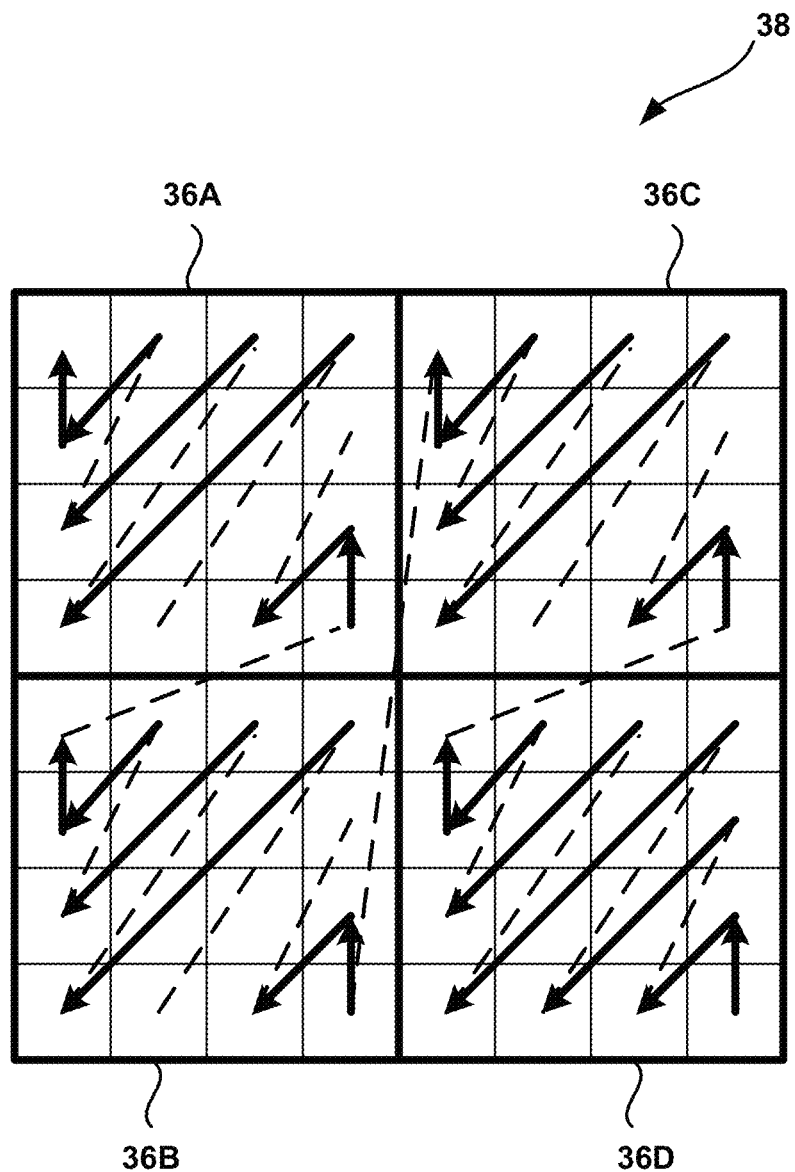
FIG. 3 is a conceptual drawing showing an example sub-block-based diagonal scan.

FIG. 3 depicts an example of a subblock based scan on an 8×8 transform block. 8×8 transform block 38 consists of four 4×4 subblocks (36A, 36B, 36C, 36D). As shown in FIG. 3, transform coefficients in subblock 36D are scanned before scanning transform coefficients in subblock 36C. The scan then proceeds from subblock 36C to subblock 36B, and finally to subblock 36A. FIG. 3 depicts an inverse diagonal scanning order in each subblock; however, any scanning order may be used (e.g., horizontal, vertical, zigzag, etc.). In other examples, forward scanning orders are used within each subblock.

In the emergent HEVC standard, coefficients may be grouped into a chunk or subset. The significance map and level information (absolute value and sign) of the transform coefficients are coded for each subset. In one example, a subset consists of 16 consecutive coefficients along a scan order (e.g., a forward or inverse diagonal, horizontal, or vertical scan order) for a 4×4 transform block and an 8×8 transform block. For 16×16 and 32×32 transform blocks, a 4×4 subblock (or subset) of transform coefficients within the larger transform block are treated as a subset. The following symbols are coded and signaled to represent the coefficients level information within a subset. In one example, all the symbols are encoded in an inverse scan order. It should be noted that the following symbols may be referred to as "flags." It should be noted that any of the "flags" discussed in this disclosure need not be limited to a binary symbol, but may also be implemented as multiple bit syntax elements.

significant_coeff_flag (abbr. sigMapFlag): This flag indicates the significance of each coefficient in a CG. A coefficient with an absolute value of one or greater is considered to be significant. As one example, a sigMapFlag value of 0 indicates that the coefficient is not significant, while a value of 1 indicates that the coefficient is significant. This flag may generally be referred to as a significance flag.

coeff_abs_level_greater1_flag (abbr. gr1Flag): This flag indicates whether the absolute value of the coefficient is larger than one for any non-zero coefficients (i.e., coefficients with sigMapFlag as 1). As one example, a gr1Flag value of 0 indicates that the coefficient does not have an absolute value greater than one, while a value of 1 for the gr1Flag indicates that the coefficient does have an absolute value greater than one. This flag may generally be referred to as a greater-than-one flag.

coeff_abs_level_greater2_flag (abbr. gr2Flag): This flag indicates whether the absolute value of the coefficient is larger than two for any coefficients with an absolute value larger than one (i.e., coefficients with gr1Flag as 1). As one example, a gr2Flag value of 0 indicates that the coefficient does not have an absolute value greater than two, while a value of 1 for the gr2Flag indicates that the coefficient does have an absolute value greater than two. This flag may generally be referred to as a greater-than-two flag.

coeff_sign_flag (abbr. signFlag): This flag indicates the sign information for any non-zero coefficients (i.e., coefficients with sigMapFlag as 1). For example, a zero for this flag indicates a positive sign, while a 1 indicates a negative sign.

coeff_abs_level_remaining (abbr. levelRem): This syntax element indicates the absolute level values of the remaining coefficients. For this flag, the absolute value of the coefficient minus three is coded (abs(level)-3) for each coefficient with an absolute value larger than two (i.e. coefficients with gr2Flag as 1).

Figure 4:
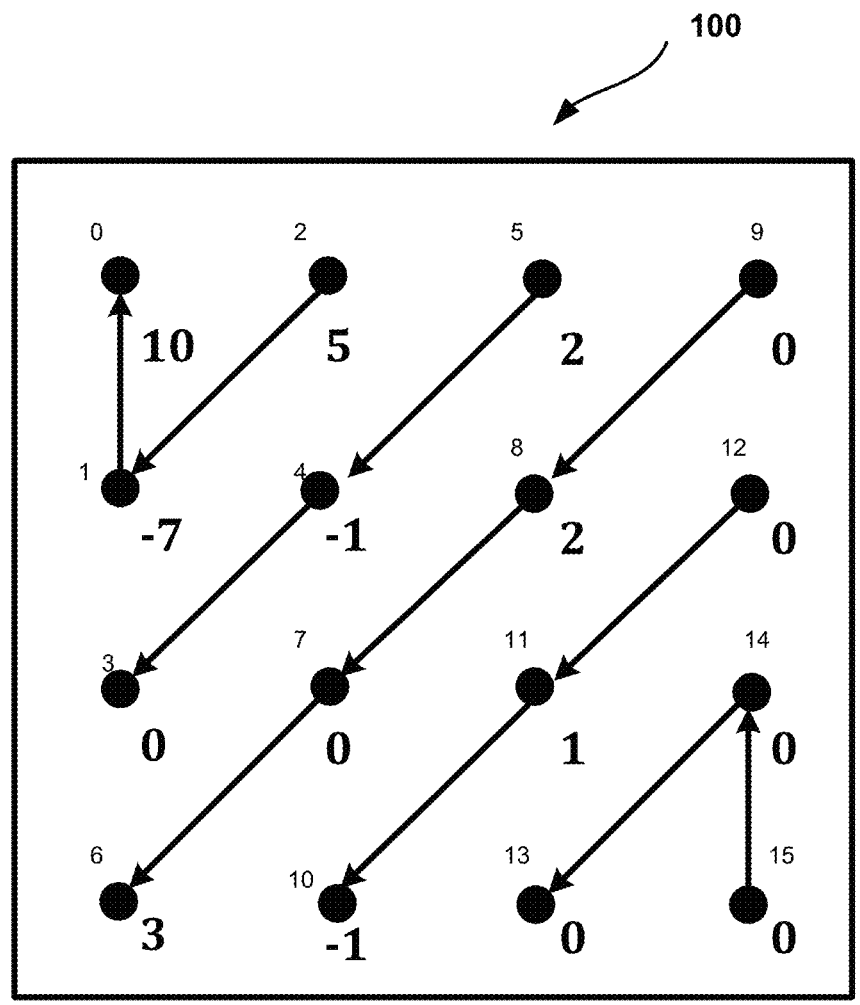
FIG. 4 is a conceptual drawing showing an example inverse diagonal scan of a 4×4 coefficient group of transform coefficients.

FIG. 4 shows an example of quantized coefficients in a 4×4 block 100. Block 100 may be a 4×4 transform block or may be a 4×4 subblock (subset) in an 8×8, 16×16 or 32×32 transform block. The encoded symbols for the coefficients shown in FIG. 4, scanned in an inverse scan order, are summarized in Table 1. In Table 1, scan_pos refers to the position of the coefficient along the inverse diagonal scan shown in FIG. 4. Scan_pos 15 is the first coefficient scanned and is located in the lower right corner of block 100. The quantized coefficient at scan_pos 15 has an absolute value of 0. Scan_pos 0 is the last coefficient scanned and is located in the upper left corner of block 100. The quantized coefficient at scan_pos 0 has an absolute value of 10. In the case of a 4×4 transform block transform block or the last 4×4 subblock in a larger transform block, the first four sigMapFlags do not need to be coded, since the position of the last non-zero coefficient is known. That is, coding of the sigMapFlag may begin at the last non-zero coefficient (in this example, the coefficient at scan_pos 11).

Flag) typically represent a substantial proportion of a compressed bitstream (around 15% to 20% depending on configurations). It is difficult to directly compress this information. However, some proposals for HEVC provide a technique to reduce the number of coded signs. Examples of such techniques are sometimes called Sign Data Hiding (SDH).

SDH techniques were described in G. Clare, et al., "Sign Data Hiding," Joint Collaborative Team on Video Coding (JCT-VC) of ITU-T SG16 WP3 and ISO/IEC JTC1/SC29/WG11, 7th Meeting: Geneva, CH, 21-30 Nov., 2011 (hereinafter, JCTVC-G271) and X. Yu, et al., "Multiple Sign Bits Hiding," Joint Collaborative Team on Video Coding (JCT-VC) of ITU-T SG16 WP3 and ISO/IEC JTC1/SC29/WG11, 8th Meeting: San José, Calif., USA, 1-10 Feb., 2012 (hereinafter, JCTVC-H0481). JCTVC-G271 is available for download at http://phenix.int-evry.fr/jct/doc_end_user/current_document.php?id=3528, as of Apr. 8, 2013. JCTVC-H0481 is available for download at http://phenix.it-sudparis.eu/jct/doc_end_user/current_document.php?id=4787, as of Apr. 8, 2013. JCTVC-G271 and JCTVC-H0481 are both incorporated by reference herein.

As discussed above, the HEVC standard currently specifies coding transform coefficients produced from residual data by performing five scan passes over each CG. As discussed above, a CG may be defined as a set of 16 coefficients in scanning order, and it is typically a sub-block of 4×4 coefficients. One of the scan passes codes the sign (i.e., coeff_sign_flags) of the significant coefficients in the CG.

When using SDH, and depending on a certain criteria, video encoder 20 may be configured to not encode the signFlag of the first non-zero coefficient. Instead, the sign value is of the first non-zero coefficient is embedded in the parity of the sum of the levels of the transform coefficient in the CG using a predefined convention (e.g., an even corresponds to plus ("+") sign and an odd parity corresponds to a minus ("−") sign).

Figure 5:
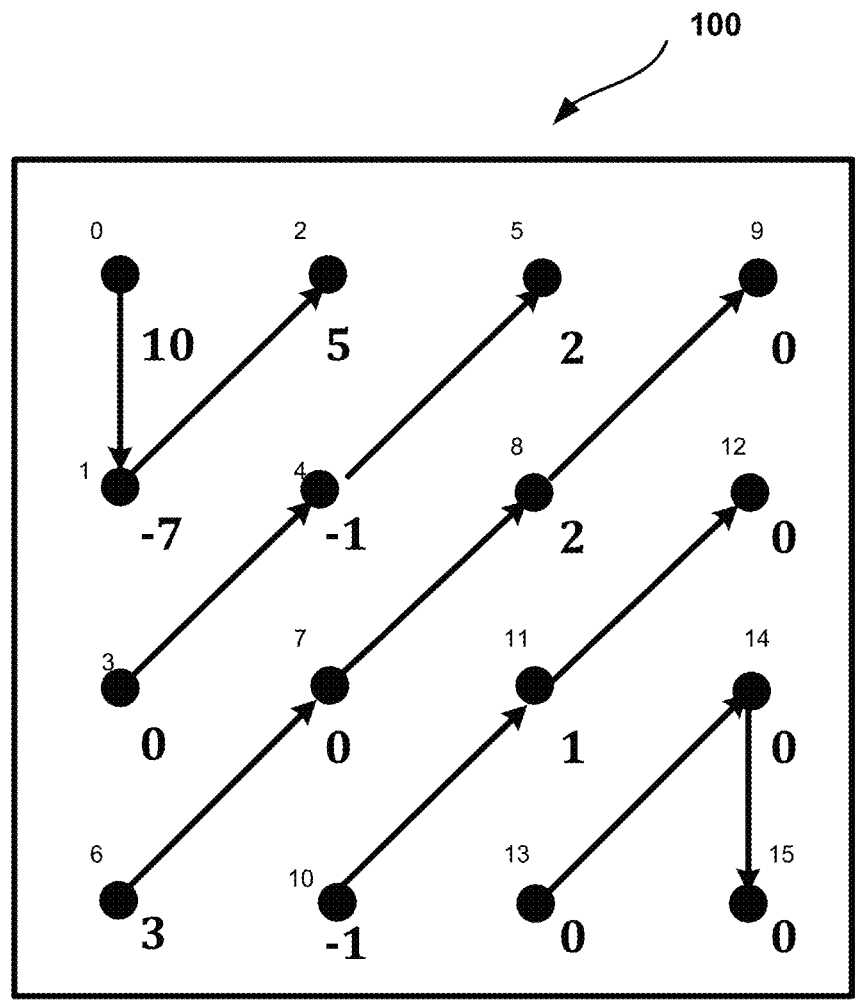
FIG. 5 is a conceptual diagram showing an example forward diagonal scan of a 4×4 coefficient group of transform coefficients.

In the context of SDH, the "first" non-zero coefficient is the first coefficient in a forward scanning order, toward the upper left corner of a CG (i.e., the lower frequency coefficients). FIG. 5 shows an example of CG 100 with a forward diagonal scanning order. The large bold number under each coefficient "dot" is the level of the transform coefficient. The small number above each dot represents the position of the transform coefficient in the scanning order. In the example of FIG.

TABLE 1

Coded symbols for the coefficients of a 4 × 4 TU or a 4 × 4 CG

| | Scan_pos | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| Coefficients | 0 | 0 | 0 | 0 | 1 | −1 | 0 | 2 | 0 | 3 | 2 | −1 | 0 | 5 | −7 | 10 |
| sigMapFlag | 0 | 0 | 0 | 0 | 1 | 1 | 0 | 1 | 0 | 1 | 1 | 1 | 0 | 1 | 1 | 1 |
| gr1Flag | | | | | 0 | 0 | | 1 | | 1 | 1 | 0 | | 1 | 1 | 1 |
| gr2Flag | | | | | | | | 0 | | 1 | 0 | | | 1 | 1 | 1 |
| signFlag | | | | | 0 | 1 | | 0 | | 0 | 0 | 1 | | 0 | 1 | 0 |
| levelRem | | | | | | | | | | 0 | | | | 2 | 4 | 7 |

Among these symbols, the bins of sigMapFlag, gr1Flag and gr2Flag are encoded with adaptive context models. The signFlag and binarized bins of levelRem are encoded through bypass mode with fixed equal probability models (e.g., an exponential Golomb code).

The sign of each non-zero coefficient (i.e., the signFlag) is encoded in bypass mode. Bypass mode may provide more efficient coding for symbols that are equiprobable and uncorrelated (e.g., the signFlag). Sign flags (coeff signfiag or sign- 5, the last non-zero coefficient in the forward diagonal scanning order occurs at position 11. The first non-zero coefficient is at position zero, with a level value of 10.

In current proposals for HEVC, the criteria used to determine whether or not to use an SDH process is the distance (in scan order) between the first and the last non-zero coefficients of the CG. If this distance is larger than a fixed threshold, SDH is used.

In the case where an SDH process is used, if the parity of the sum of the levels in the CG matches the sign that has been hidden (e.g., the sign of the first non-zero coefficient), no additional processing is needed at video encoder 20, and one bit of information is saved. If the parity of the sum of the levels in the CG does not match the sign that has been hidden, video encoder 20 is configured to change the value of one of the quantized transform coefficients in the CG so that the parity matches the sign. Typically, video encoder 20 would simply add or subtract one from the value of the one of the transform coefficients. Which transform coefficient value to change is an encoder choice, and it is up to the implementer which transform coefficient to modify and how. It is preferable to make a change that least affects rate-distortion performance of the encoded bitstream.

At video decoder 30, if the criterion for performing an SDH process is met, the sign of the first non-zero coefficient of each CG is not decoded. Instead, it is simply inferred from the parity of the sum of the levels of the transform coefficients in the CG. As such, if SDH is enabled for a CG based on the criteria, video decoder 30 is configured to determine the parity of the sum of the levels of the transform coefficients in the CG to determine the sign value that was not coded (i.e., essentially "hidden") for the first non-zero transform coefficient in the CG.

In general, in the context of this disclosure, performing an SDH process in a video encoding process (e.g., by video encoder 20) involves not encoding or "hiding" the sign value of one or more transform coefficients. That is, instead of encoding the signFlag, its value is derivable from other features of the transform coefficients (e.g., the parity of the sum of the levels). Likewise, performing an SDH process in a video decoding process (e.g., by video decoder 30) involves decoding or "unhiding" the sign value of one or more transform coefficients.

To put it in a more formal way, let absSum be the sum of the absolute values of the levels of the quantized coefficients in a CG. Let firstNZPosInCG and lastNZPosInCG be the first and last non-zero (significant) coefficient in a forward scanning order in the CG, respectively. A sign is hidden in the CG, in the parity of the sum of the coefficients in the CG, if last*NZ*PosInCG−first*NZ*PosIn*CG*>=*T*1, where T1 is a threshold. The parity can be simply derived by parity=(*abs*Sum & 0*x*1), where & is the bit-wise AND operation. That is, the parity is 1 if absSum is odd and the parity is 0 if absSum is even. Then, if the condition of hiding a sign is true, video decoder 30 does not decode the sign for the first coefficient of the CG in scan order. Instead, it derives the sign from the parity as follows:

If parity=1 (odd), then the first coefficient is negative
If parity=0 (even), then the first coefficient is positive SDH is a new technique that has not been refined. As such, several initial drawbacks have been observed. First, the criteria used to determine whether to use the SDH process is the distance in scanning order between the first and the last significant coefficient in the CG. This requires storing two variables to make the decision, and adds complexity to video encoder 20 and video decoder 30. Additionally, current proposals only specify hiding one sign per CG, thus limiting potential benefits. In view of these drawbacks, this disclosure proposes techniques to improve several features of SDH, especially with regard to a performance/complexity trade-off.

In current proposals for SDH, the criteria used to determine whether or not to apply SDH requires keeping two variables for each CG: the position of the first and last non-zero coefficient of the CG (firstNZPosInCG and lastNZPosInCG, respectively). Requiring video decoder 30 to keep track of two variables while decoding is more costly than keeping just one. This disclosure proposes using a single variable per CG to determine whether or not to apply SDH (i.e., to perform a sign data hiding process).

In one example of the disclosure, the single variable for determining whether or not to apply SDH depends only on the position of the last non-zero coefficient in the CG relative to some predetermined threshold T1:

last*NZ*PosIn*CG*>=*T*1

That is, video encoder 20 and video decoder 30 will determine whether or not to perform an SDH process based on a comparison of lastNZPosInCG to a threshold. In particular, if lastNZPosInCG>=T1, then video encoder 20 or video decoder 30 will perform an SDH process.

This single variable is simpler and has shown to have the same rate-distortion performance as the two variable criteria previously proposed for SDH. The variable lastNZPosInCG is the scan position of the last non-zero coefficient within the CG in a forward scanning order. That means that the value of lastNZPosInCG is between 0 and the number of coefficients in the CG minus 1. For example, for a 4×4 CG, the scan positions values of lastNZPosInCG may be between 0 and 15. T1 may be selected to be any value. Testing has shown that a value of T1 of 4 or 5, for a 16 coefficient CG, works well in video decoders configured to decode video in accordance with HEVC.

As another example of the disclosure, the single variable for determining whether or not to apply SDH depends only on the number of non-zero coefficients number in the CG relative to some predetermined threshold:

num*NZ*CoeffsIn*CG*>=*T*1 where numNZCoeffsInCG represents the number of non-zero (significant) coefficients in the current CG. That is, video encoder 20 and video decoder 30 will determine whether or not to perform an SDH process based on a comparison of numNZCoeffsInCG to a threshold. In particular, if numNZCoeffsInCG>=T1, the SDH process will be applied. Again, any value of T1 may be used. Testing has shown that a value of T1 of 2, 3, or 4, for a 16 coefficient CG, works well in video decoders configured to decode video in accordance with HEVC.

In another example of the disclosure, the single variable for determining whether or not to apply SDH is the sum of the absolute value of the coefficients (absSum) in a CG. That is, if absSum>=T1, then SDH is applied. As such, video encoder 20 and video decoder 30 will determine whether or not to perform an SDH process based on a comparison of absSum to a threshold. Again, any value of T1 may be used. Testing has shown that a value of T1 of 2, for a 16 coefficient CG, works well in video decoders configured to decode video in accordance with HEVC.

In another example, a combination of the previous criteria may be applied for determining whether or not to apply SDH. For example, two or more criteria may be applied for a single CG. In another example, a single variable is used for each CG, but different CGs in a TU, slice, or frame may use different criteria.

In another example of the disclosure, rather than hiding the sign of the first non-zero coefficient in a CG, according to a forward scanning order, better coding performance could be achieved by configuring video encoder 20 and video decoder 30 to hide the last non-zero coefficient in the CG. Again, in this context, the last non-zero coefficient is specified relative to a forward scanning order. A study of the statistical characteristics of quantized coefficients led to the conclusion that hiding the sign of the first non-zero coefficient in the scanning order is not optimal from a rate-distortion perspective. Instead, an improved rate-distortion trade off may be achieved by hiding the sign of the last non-zero coefficient.

Hence, in one example, this disclosure proposes to hide the sign of the last coefficient of a CG in a forward scanning order. This technique may be applied with any of the techniques discussed above relating to using a single variable to determine whether or not to apply SDH. In this regard, any of the single variable techniques described above may also be used with an SDH process that hides the first, or any other non-zero coefficient of a CG.

By hiding the last non-zero coefficient of a CG, developers of video encoder (e.g., video encoder 20) are given more freedom to alter quantization levels of coefficients in a CG at the lower frequencies (i.e., toward the upper left corner of the CG) where the values are more likely to be non-zero or close to being quantized as non-zero. Consequently, additional coding gain may be achieved.

In order to further improve the performance of SDH, this disclosure further proposes to hide the sign of two or more coefficients in a CG. As one example, if two signs are hidden, the variable to hide a second sign may be $$\text{last}NZ\text{PosIn}CG >= T2$$

Therefore, no signs are hidden if lastNZPosInCG<T1, in accordance with the example above, only one sign is hidden if T1<=lastNZPosInCG<T2, and two signs are hidden if lastNZPosInCG>=T2. Of course, if this variable is used, two signs can be hidden only if there are at least two non-zero coefficients. So, an additional check would be necessary. That is, video encoder 20 and video decoder 30 would determine if the number of non-zero coefficients is larger than 1 in order to hide a second sign.

Similarly, instead of comparing lastNZPosInCG to a second threshold to determine whether or not to hide a second sign, the current version of the variables (i.e., the distance between the first and last non-zero coefficient) can be used to determine whether to hide a second sign:

$$\text{last}NZ\text{PosIn}CG - \text{first}NZ\text{PosIn}CG >= T2$$

In the case that video encoder 20 and video decoder 30 determines to perform an SDH process for two signs, this disclosure proposes to hide the sign of the first two non-zero coefficients in a forward scanning order in one example. In a second example, the sign of the first and last non-zero coefficients in the scanning order are hidden. This is also possible because, if two signs are hidden, then there are necessarily at least two non-zero coefficients. Even if there were only two non-zero coefficients, they would be, by definition, the first and the last in scanning order. In another example, the signs of the two last coefficients in the scanning order in a CG are hidden.

In another example, the variable used to determine whether or not to hide a second sign may be:

$$\text{num}NZ\text{CoeffsIn}CG >= T2.$$

With this variable, no signs are hidden if numNZCoeffsInCG<T1, only one sign is hidden if T1<=numNZCoeffsInCG<T2, and two signs are hidden numNZCoeffsInCG>=T2.

In the case that two signs are hidden, the parity of the sum of the levels of the coefficient in the CG is not enough to hide 2 bits (i.e., the two sign values), since parity can only denote two cases (0 or 1). Two sign values requires 2 bits of information (0/1 for one sign, and 0/1 for the other sign). Therefore, another way to hide the signs is necessary.

In one example, a first sign is hidden in the parity of the sum of the absolute value of the levels (test absSum & 0x1). A second sign is hidden in the parity of (absSum>>1), where >> is the right shift operation. This is equivalent to performing the check (absSum& 0x2).

In another embodiment, the first sign is hidden in the parity of the levels of the coefficients of a first part of a CG in scan order (e.g., the first eight coefficient values of a CG) and the second sign is hidden in the parity of the second part of the coefficients (e.g., the other eight coefficient values of the CG). The division in the parts of the CG can be fixed, determined by the number of non-zero coefficients in the CG, or depend on the position of the first and last non-zero coefficients.

In another example, the first sign to be hidden in the SDH process is hidden in the parity of the levels of the coefficients located in scan positions indexed with an even number, and the second sign to be hidden in the SDH process is hidden in the parity of the levels of the coefficients located in a scan positions with an odd number index, or vice versa In various examples, all methods (second sign hiding variable and sign-hiding schemes) described above can be simply extended to hide more than two sign flags by adding additional thresholds.

Video encoder 20 may be configured to signal syntax elements in one or more of a sequence parameter set (SPS), picture parameter set (PPS), adaptation pararmeter set (APS), and/or slice header to indicate whether a second sign is hidden for the sequence or for the current picture/slice. Additional syntax elements may also be signaled to indicate a threshold value for hiding the second sign per CG, or any other threshold value described above.

As mentioned above, current proposals for applying SDH use a criterion that requires keeping two variables for each CG: the first and last non-zero of the CG (firstNZPosInCG and lastNZPosInCG, respectively). Keeping track of two variables while decoding is more costly than keeping just one or none.

As such, in another example, this disclsoure proposes to make the determination of whether or not to perform and SDH process only once per TU (or transform block), as opposed to once per CG.

In one example, this disclosure proposes that the single variable used to determine whether or not to perform an SDH process for CGs in a TU (or transform block) is the position of the last significant coefficient (lastNZPosInTU) in a TU (or transform block) in a forward scanning order compared to some threshold. For example, if the last position is $$\text{last}NZ\text{PosIn}TU >= 4,$$

then a sign is hidden for one coefficient in the CG that contains the last non-zero coefficient. Otherwise, a sign value is not hidden in that CG.

In one example, the syntax element lastNZPosInTU refers to the position of the last coefficient in the TU in scan order with respect to the position in scan order of the first element of the last CG. In other words, lastNZPosInTU has a value of 0 to 15 (i.e., the size of CG), not from 0 to the size of the TU. The syntax element lastNZPosInTU is the last non-zero coefficient in a TU, which is information that HEVC already requires to be signaled in the bitstream. The value of lastNZPosInTU value is measured with respect to the beginning of the CG with the last coefficient. As such, the values of lastNZPosInTU will be similar or the same as lastNZPosInCG.

Sign values are always hidden in each CG that precedes the CG containing the last significant coefficient. The syntax element lastNZPosInTU is the last non-zero coefficient in a TU, in a forward scanning order, which is information that is already specified and signaled in an HEVC compliant bitstream. The threshold may be any value. Testing has shown that a value of 4 works well. As such, this variable is only tested once per TU (or transform block), and the CG with the last coefficient may hide at least one sign according to this variable, and all the other CGs from the last to the first (in forward CG scan order) hide at least one sign.

Figure 6:
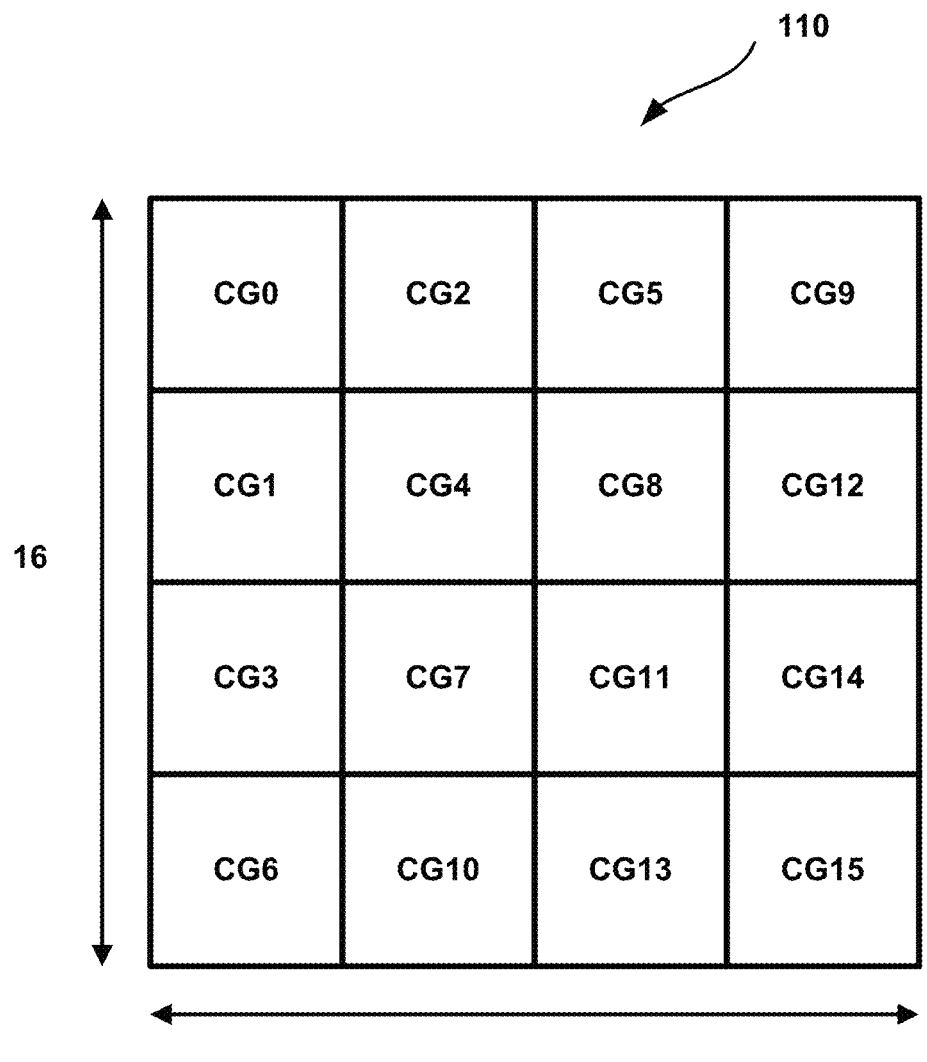
FIG. 6 is a conceptual diagram showing an example transform unit containing multiple coefficient groups.

FIG. 6 is a conceptual diagram showing an example TU 110 divided into multiple CGs. In this example, TU 110 is a 16×16 TU containing 16 4×4 CGs. The CGs are labeled 0-15, designating their positions in a forward diagonal scanning order. As one example, assume that the position of the last non-zero coefficient in TU 110 (lastNZPosInTU) occurs in CG11. If the position of the last non-zero coefficient in CG11 is greater than the threshold (e.g., 4) then at least one sign is hidden in CG11. In addition, SDH is applied for every CG preceding CG 11 (i.e., CG0–CG10).

By checking only one variable per TU to determine whether or not to apply SDH, there is no need to track the first and last non-zero coefficients in a CG. Also, there is no need to determine whether or not to apply SDH for every CG.

Therefore, the HEVC SDH algorithm may be greatly simplified with these techniques, while at the same time, rate-distortion benefits of SDH for multiple CGs in a TU may also be achieved.

In effect, a TU is divided in multiple non-overlapping sets of consecutive coefficients in scanning order. Then, at least one sign value is automatically hidden for all the sets (i.e., CGs) except for the CG containing the last non-zero coefficient in the TU. For this last CG, a single variable is checked, and according to the variable, SDH is applied or not. The selected variable in this case is information already available in the bitstream (i.e., the position of the last significant coefficient in the TU which referenced/subtracted from the position in scan order of the first coefficient in the CG), so no additional data has to be computed for the variable. However, it should be noted that other criteria for determining the application of SDH for the CG containing the last significant coefficient would be applicable as well.

The syntax table below shows an example of the modification to HEVC syntax when using the technique of determining the application of SDH once per. The bold syntax elements are related to the new variable used in this example. Note that the condition check occurs only once per TU, outside the CG loop.

| residual_coding( x0, y0, log2TrafoWidth, log2TrafoHeight, scanIdx, cIdx ) { | Descriptor |
|---|---|
|   if( log2TrafoWidth = = 1 \|\| log2TrafoHeight = = 1 ) { | |
|     log2TrafoWidth = 2 | |
|     log2TrafoHeight = 2 | |
|   } | |
|   If( transform_skip_enabled_flag && !cu_transquant_bypass_flag && | |
|     (PredMode = = MODE_INTRA) && | |
|     ( log2TrafoWidth = = 2) && (log2TrafoHeight = = 2) ) | |
|       transform_skip_flag[ x0 ][ y0 ][ cIdx ] | ae(v) |
|   last_significant_coeff_x_prefix | ae(v) |
|   last_significant_coeff_y_prefix | ae(v) |
|   if( last_significant_coeff_x_prefix > 3 ) | |
|     last_significant_coeff_x_suffix | ae(v) |
|   if( last_significant_coeff_y_prefix > 3 ) | |
|     last_significant_coeff_y_suffix | ae(v) |
|   numCoeff = 0 | |
|   do { | |
|     xC = ScanOrder[ log2TrafoWidth ][ log2TrafoHeight ][ scanIdx ][ numCoeff ][ 0 ] | |
|     yC = ScanOrder[ log2TrafoWidth ][ log2TrafoHeight ][ scanIdx ][ numCoeff ][ 1 ] | |
|     numCoeff++ | |
|   } while( ( xC != LastSignificantCoeffX ) \|\| ( yC != LastSignificantCoeffY ) ) | |
|   numLastSubset = (numCoeff − 1) >> 4 | |
|   signHidden = ((numCoeff − 1) − (numLastSubset <<4) >= | |
| sign_hiding_threshold ? 1 : 0 | |
|   for( i = numLastSubset; i >= 0; i− − ) { | |
|     offset = i << 4 | |
|     if( scanIdx = = 1 && log2TrafoWidth = = 3 && log2TrafoHeight = = 3 ) { | |
|       xCG = 0 | |
|       yCG = i | |
|     } else if( scanIdx = = 2 && log2TrafoWidth = = 3 && log2TrafoHeight = = 3) { | |
|       xCG = i | |
|       yCG = 0 | |
|     } else { | |
|       xCG = ScanOrder[ log2TrafoWidth ][ log2TrafoHeight ][ scanIdx ][ i << 4 ][ 0 ]>> 2 | |
|       yCG = ScanOrder[ log2TrafoWidth ][ log2TrafoHeight ][ scanIdx ][ i << 4 ][ 1 ]>> 2 | |
|     } | |
|     implicitNonZeroCoeff = 0 | |
|     if( ( i < numLastSubset) && ( i > 0) ) { | |
|       significant_coeff_group_flag[ xCG ][ yCG ] | ae(v) |
|       implicitNonZeroCoeff = 1 | |
|     } | |
|     for( n = 15; n >= 0; n− − ) { | |
|       xC = ScanOrder[ log2TrafoWidth ][ log2TrafoHeight ][ scanIdx ][ n + offset ][ 0 ] | |
|       yC = ScanOrder[ log2TrafoWidth ][ log2TrafoHeight ][ scanIdx ][ n + offset ][ 1 ] | |
|       if( (n + offset) < (numCoeff − 1) && significant_coeff_group_flag[ xCG ][ yCG ] && | |
|         (n > 0 \|\| implicitNonZeroCoeff = = 0 ) ) { | |
|         significant_coeff_flag[ xC ][ yC ] | ae(v) |
|         if( significant_coeff_flag[ xC ][ yC ] = = 1 ) | |
|           implicitNonZeroCoeff = 0 | |

| | Descriptor |
|---|---|
| residual_coding( x0, y0, log2TrafoWidth, log2TrafoHeight, scanIdx, cIdx ) { | |
|       } | |
|     } | |
|     firstNZPosInCG = 16 | |
|     numSigCoeff = 0 | |
|     firstGreater1CoeffIdx = −1 | |
|     for( n = 15; n >= 0; n − − ) { | |
|       xC = ScanOrder[ log2TrafoWidth ][ log2TrafoHeight ][ scanIdx ][ n + offset ][ 0 ] | |
|       yC = ScanOrder[ log2TrafoWidth ][ log2TrafoHeight ][ scanIdx ][ n + offset ][ 1 ] | |
|       if( significant_coeff_flag[ xC ][ yC ] ) { | |
|         if( numSigCoeff < 8) { | |
|           coeff_abs_level_greater1_flag[ n ] | ae(v) |
|           numSigCoeff++ | |
|           if( coeff_abs_level_greater1_flag[ n ]&& firstGreater1CoeffIdx == −1 ) | |
|             firstGreater1CoeffIdx = n | |
|         } | |
|         firstNZPosInCG = n | |
|       } | |
|     } | |
|     if( firstGreater1CoeffIdx != −1 ) | |
|       coeff_abs_level_greater2_flag[ firstGreater1CoeffIdx] | ae(v) |
|     for( n = 15; n >= 0; n−− ) { | |
|       xC = ScanOrder[ log2TrafoWidth ][ log2TrafoHeight ][ scanIdx ][ n + offset ][ 0 ] | |
|       yC = ScanOrder[ log2TrafoWidth ][ log2TrafoHeight ][ scanIdx ][ n + offset ][ 1 ] | |
|       if( significant_coeff_flag[ xC ][ yC ] && | |
|         (!sign_data_hiding_flag \|\| !signHidden \|\| n != firstNZPosInCG) ) | |
|         coeff_sign_flag[ n ] | ae(v) |
|     } | |
|     numSigCoeff = 0 | |
|     sumAbs = 0 | |
|     for( n = 15; n >= 0; n − − ) { | |
|       xC = ScanOrder[ log2TrafoWidth ][ log2TrafoHeight ][ scanIdx ][ n + offset ][ 0 ] | |
|       yC = ScanOrder[ log2TrafoWidth ][ log2TrafoHeight ][ scanIdx ][ n + offset ][ 1 ] | |
|       if( significant_coeff_flag[ xC ][ yC ] ) { | |
|         baseLevel = 1 + coeff_abs_level_greater1_flag[ n ] + coeff_abs_level_greater2_flag[ n ] | |
|         if( baseLevel == ( ( numSigCoeff < 8) ? ( (n == firstGreater1CoeffIdx) ? 3 : 2) : 1 ) ) | |
|           coeff_abs_level_remaining[ n ] | ae(v) |
|         transCoeffLevel[ x0 ][ y0 ][ cIdx ][ xC ][ yC ] = | |
|           ( coeff_abs_level_remaining[ n ] + baseLevel ) * ( 1 − 2 * coeff_sign_flag[ n ] ) | |
|         if( sign_data_hiding_flag && signHidden ) { | |
|           sumAbs += ( coeff_abs_level_remaining[ n ]+ baseLevel ) | |
|           if( n == firstNZPosInCG && (sumAbs%2 == 1) ) | |
|             transCoeffLevel[x0][y0][cIdx][xC][yC]= − transCoeffLevel[x0][y0][cIdx][xC][yC] | |
|         } | |
|         numSigCoeff++ | |
|       } else | |
|         transCoeffLevel[ x0 ][ y0 ][ cIdx ][ xC ][ yC ] = 0 | |
|     } | |
|     signHidden = 1 | |
|   } | |
| } | |

SDH is an inherently a lossy technique since quantized values may be changed from their original value to meet the sign-hiding constraints. Therefore, it may not be desirable to apply SDH in situations where lossless coding is to be performed.

Proposals for HEVC include the use of a flag to indicate lossless coding (e.g., cu_transquant_bypass_flag). This flag causes video decoder 30 to skip transform and quantization to achieve lossless coding. In that case, SDH also should be disabled. To attain that, the conditions above may be modified as follows:
signHidden=((numCoeff−1)−(numLastSubset<<4)>=sign_hiding_threshold?1:0 is changed to signHidden=((numCoeff−1)−(numLastSubset<<4)>=sign_hiding_threshold && !cu_transquant_bypass_flag)?1:0. Also signHidden=1 is changed to signHidden=!cu_transquant_bypass_flag?1:0.

Figure 7:
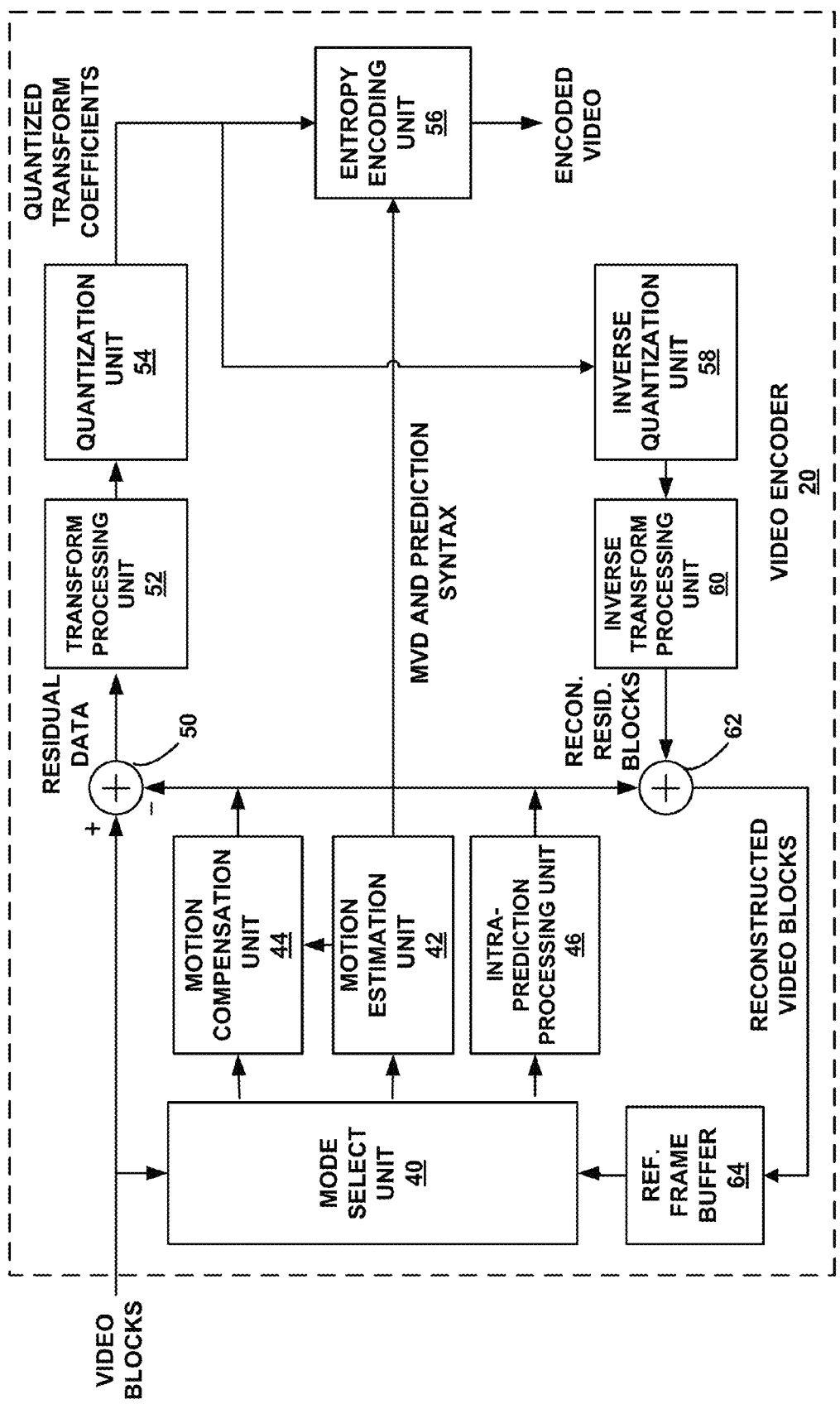
FIG. 7 is a block diagram illustrating an example video encoder.

FIG. 7 is a block diagram illustrating an example of a video encoder 20 that may use techniques for coding transform coefficients as described in this disclosure. The video encoder 20 will be described in the context of HEVC coding for purposes of illustration, but without limitation of this disclosure as to other coding standards or methods that may require scanning of transform coefficients. The video encoder 20 may perform intra- and inter-coding of CUs within video frames. Intra-coding relies on spatial prediction to reduce or remove spatial redundancy in video data within a given video frame. Inter-coding relies on temporal prediction to reduce or remove temporal redundancy between a current frame and previously coded frames of a video sequence. Intra-mode (I-mode) may refer to any of several spatial-based video compression modes. Inter-modes such as uni-directional prediction (P-mode) or bi-directional prediction (B-mode) may refer to any of several temporal-based video compression modes.

As shown in FIG. 7, the video encoder 20 receives a current video block within a video frame to be encoded. In the example of FIG. 7, the video encoder 20 includes a motion compensation unit 44, a motion estimation unit 42, an intra-prediction processing unit 46, a reference frame buffer 64, a summer 50, a transform processing unit 52, a quantization unit 54, and an entropy encoding unit 56. The transform processing unit 52 illustrated in FIG. 7 is the unit that applies the actual transform or combinations of transform to a block of residual data, and is not to be confused with a block of transform coefficients, which also may be referred to as a transform unit (TU) of a CU. For video block reconstruction, the video encoder 20 also includes an inverse quantization unit 58, an inverse transform processing unit 60, and a summer 62. A deblocking filter (not shown in FIG. 7) may also be included to filter block boundaries to remove blockiness artifacts from reconstructed video. If desired, the deblocking filter would typically filter the output of the summer 62.

During the encoding process, the video encoder 20 receives a video frame or slice to be coded. The frame or slice may be divided into multiple video blocks, e.g., largest coding units (LCUs). The motion estimation unit 42 and the motion compensation unit 44 perform inter-predictive coding of the received video block relative to one or more blocks in one or more reference frames to provide temporal compression. The intra-prediction processing unit 46 may perform intra-predictive coding of the received video block relative to one or more neighboring blocks in the same frame or slice as the block to be coded to provide spatial compression.

The mode select unit 40 may select one of the coding modes, intra or inter, e.g., based on error (i.e., distortion) results for each mode, and provides the resulting intra- or inter-predicted block (e.g., a prediction unit (PU)) to the summer 50 to generate residual block data and to the summer 62 to reconstruct the encoded block for use in a reference frame. Summer 62 combines the predicted block with inverse quantized, inverse transformed data from inverse transform processing unit 60 for the block to reconstruct the encoded block, as described in greater detail below. Some video frames may be designated as I-frames, where all blocks in an I-frame are encoded in an intra-prediction mode. In some cases, the intra-prediction processing unit 46 may perform intra-prediction encoding of a block in a P- or B-frame, e.g., when the motion search performed by the motion estimation unit 42 does not result in a sufficient prediction of the block.

The motion estimation unit 42 and the motion compensation unit 44 may be highly integrated, but are illustrated separately for conceptual purposes. Motion estimation (or motion search) is the process of generating motion vectors, which estimate motion for video blocks. A motion vector, for example, may indicate the displacement of a prediction unit in a current frame relative to a reference sample of a reference frame. The motion estimation unit 42 calculates a motion vector for a prediction unit of an inter-coded frame by comparing the prediction unit to reference samples of a reference frame stored in the reference frame buffer 64. A reference sample may be a block that is found to closely match the portion of the CU including the PU being coded in terms of pixel difference, which may be determined by sum of absolute difference (SAD), sum of squared difference (SSD), or other difference metrics. The reference sample may occur anywhere within a reference frame or reference slice, and not necessarily at a block (e.g., coding unit) boundary of the reference frame or slice. In some examples, the reference sample may occur at a fractional pixel position.

The motion estimation unit 42 sends the calculated motion vector to the entropy encoding unit 56 and the motion compensation unit 44. The portion of the reference frame identified by a motion vector may be referred to as a reference sample. The motion compensation unit 44 may calculate a prediction value for a prediction unit of a current CU, e.g., by retrieving the reference sample identified by a motion vector for the PU.

The intra-prediction processing unit 46 may intra-predict the received block, as an alternative to inter-prediction performed by the motion estimation unit 42 and the motion compensation unit 44. The intra-prediction processing unit 46 may predict the received block relative to neighboring, previously coded blocks, e.g., blocks above, above and to the right, above and to the left, or to the left of the current block, assuming a left-to-right, top-to-bottom encoding order for blocks. The intra-prediction processing unit 46 may be configured with a variety of different intra-prediction modes. For example, the intra-prediction processing unit 46 may be configured with a certain number of directional prediction modes, e.g., thirty-four directional prediction modes, based on the size of the CU being encoded.

The intra-prediction processing unit 46 may select an intra-prediction mode by, for example, calculating error values for various intra-prediction modes and selecting a mode that yields the lowest error value. Directional prediction modes may include functions for combining values of spatially neighboring pixels and applying the combined values to one or more pixel positions in a PU. Once values for all pixel positions in the PU have been calculated, the intra-prediction processing unit 46 may calculate an error value for the prediction mode based on pixel differences between the PU and the received block to be encoded. The intra-prediction processing unit 46 may continue testing intra-prediction modes until an intra-prediction mode that yields an acceptable error value is discovered. The intra-prediction processing unit 46 may then send the PU to the summer 50.

The video encoder 20 forms a residual block by subtracting the prediction data calculated by the motion compensation unit 44 or the intra-prediction processing unit 46 from the original video block being coded. The summer 50 represents the component or components that perform this subtraction operation. The residual block may correspond to a two-dimensional matrix of pixel difference values, where the number of values in the residual block is the same as the number of pixels in the PU corresponding to the residual block. The values in the residual block may correspond to the differences, i.e., error, between values of co-located pixels in the PU and in the original block to be coded. The differences may be chroma or luma differences depending on the type of block that is coded.

The transform processing unit 52 may form one or more transform units (TUs) from the residual block. The transform processing unit 52 selects a transform from among a plurality of transforms. The transform may be selected based on one or more coding characteristics, such as block size, coding mode, or the like. The transform processing unit 52 then applies the selected transform to the TU, producing a video block comprising a two-dimensional array of transform coefficients.

The transform processing unit 52 may send the resulting transform coefficients to the quantization unit 54. The quantization unit 54 may then quantize the transform coefficients. The entropy encoding unit 56 may then perform a scan of the quantized transform coefficients in the matrix according to a scanning mode. This disclosure describes the entropy encoding unit 56 as performing the scan. However, it should be understood that, in other examples, other processing units, such as the quantization unit 54, could perform the scan.

Once the transform coefficients are scanned into the one-dimensional array, the entropy encoding unit 56 may apply entropy coding such as CABAC, syntax-based context-adaptive binary arithmetic coding (SBAC), Probability Interval Partitioning Entropy (PIPE), or another entropy coding methodology to the coefficients.

To perform CABAC, the entropy encoding unit 56 may select a context model to apply to a certain context to encode symbols to be transmitted. The context may relate to, for example, whether neighboring values are non-zero or not. The entropy encoding unit 56 may also entropy encode syntax elements, such as the signal representative of the selected transform.

Entropy encoding unit 56 may be further configured to perform a sign data hiding process in accordance with the techniques of this disclosure described above. Additional details of how the techniques of this disclosure may be implemented with entropy encoding unit 56 will be described with reference to FIG. 9 below.

Following the entropy coding by the entropy encoding unit 56, the resulting encoded video may be transmitted to another device, such as the video decoder 30, or archived for later transmission or retrieval.

In some cases, the entropy encoding unit 56 or another unit of the video encoder 20 may be configured to perform other coding functions, in addition to entropy coding. For example, the entropy encoding unit 56 may be configured to determine coded block pattern (CBP) values for CU's and PU's. Also, in some cases, the entropy encoding unit 56 may perform run length coding of coefficients.

The inverse quantization unit 58 and the inverse transform processing unit 60 apply inverse quantization and inverse transformation, respectively, to reconstruct the residual block in the pixel domain, e.g., for later use as a reference block. The motion compensation unit 44 may calculate a reference block by adding the residual block to a predictive block of one of the frames of the reference frame buffer 64. The motion compensation unit 44 may also apply one or more interpolation filters to the reconstructed residual block to calculate sub-integer pixel values for use in motion estimation. The summer 62 adds the reconstructed residual block to the motion compensated prediction block produced by the motion compensation unit 44 to produce a reconstructed video block for storage in the reference frame buffer 64. The reconstructed video block may be used by the motion estimation unit 42 and the motion compensation unit 44 as a reference block to inter-code a block in a subsequent video frame.

Figure 8:
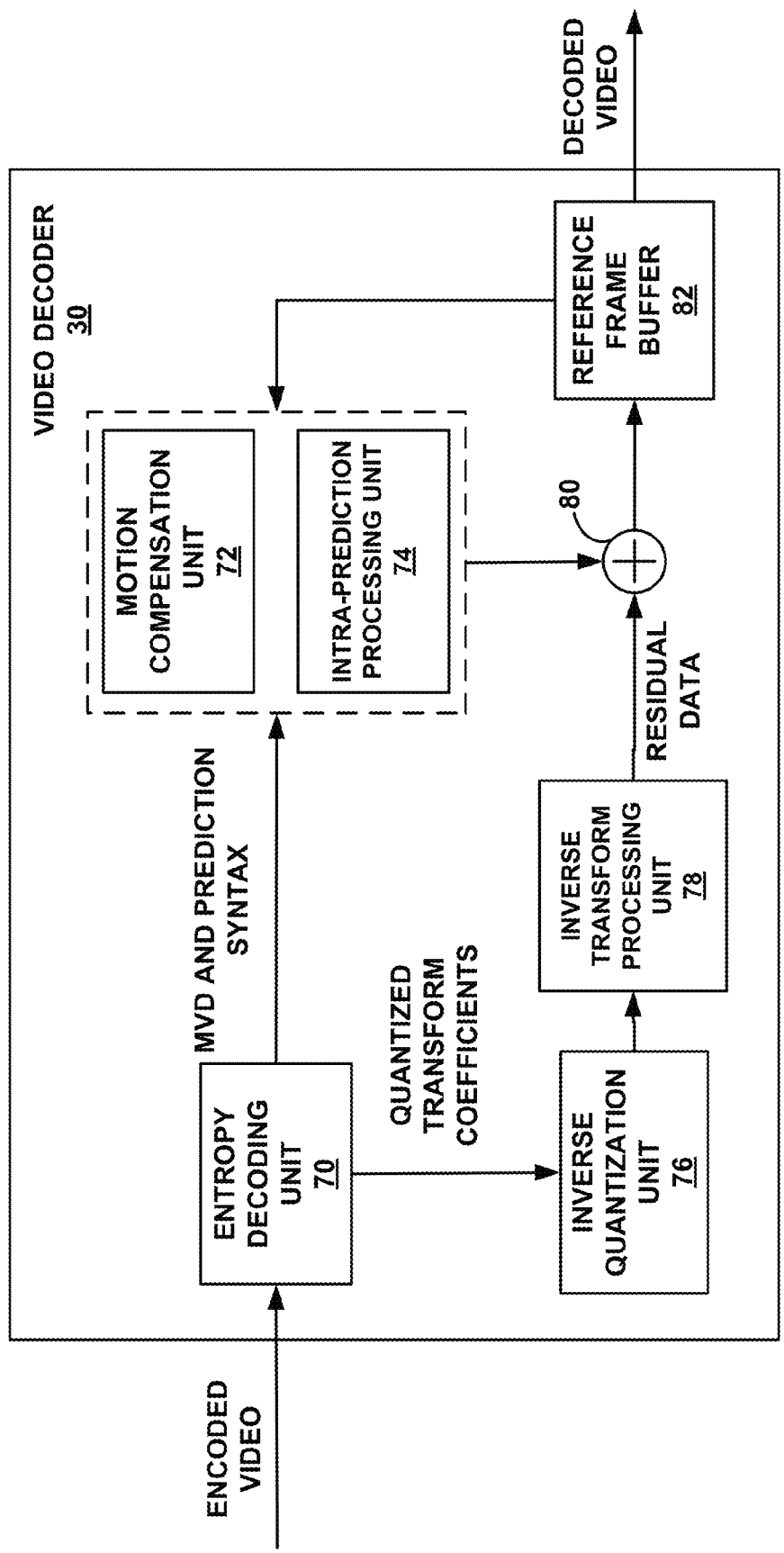
FIG. 8 is a block diagram illustrating an example video decoder.

FIG. 8 is a block diagram illustrating an example of a video decoder 30, which decodes an encoded video sequence in accordance with the transform coefficient coding techniques described in this disclosure. In the example of FIG. 8, the video decoder 30 includes an entropy decoding unit 70, a motion compensation unit 72, an intra-prediction processing unit 74, an inverse quantization unit 76, an inverse transformation unit 78, a reference frame buffer 82 and a summer 80. The video decoder 30 may, in some examples, perform a decoding pass generally reciprocal to the encoding pass described with respect to the video encoder 20 (see FIG. 7).

The entropy decoding unit 70 performs an entropy decoding process on the encoded bitstream to retrieve a one-dimensional array of transform coefficients. The entropy decoding process used depends on the entropy coding used by the video encoder 20 (e.g., CABAC). The entropy coding process used by the encoder may be signaled in the encoded bitstream or may be a predetermined process. Entropy decoding unit 70 may be further configured to perform a sign data hiding process in accordance with the techniques of this disclosure described above. Additional details of how the techniques of this disclosure may be implemented with entropy decoding unit 70 will be described with reference to FIG. 10 below.

In some examples, the entropy decoding unit 70 (or the inverse quantization unit 76) may scan the received values using a scan mirroring the scanning mode used by the entropy encoding unit 56 (or the quantization unit 54) of the video encoder 20. Although the scanning of coefficients may be performed in the inverse quantization unit 76, scanning will be described for purposes of illustration as being performed by the entropy decoding unit 70. In addition, although shown as separate functional units for ease of illustration, the structure and functionality of the entropy decoding unit 70, the inverse quantization unit 76, and other units of the video decoder 30 may be highly integrated with one another.

The inverse quantization unit 76 inverse quantizes, i.e., de-quantizes, the quantized transform coefficients provided in the bitstream and decoded by the entropy decoding unit 70. The inverse quantization process may include a conventional process, e.g., similar to the processes proposed for HEVC or defined by the H.264 decoding standard. The inverse quantization process may include use of a quantization parameter QP calculated by the video encoder 20 for the CU to determine a degree of quantization and, likewise, a degree of inverse quantization that should be applied. The inverse quantization unit 76 may inverse quantize the transform coefficients either before or after the coefficients are converted from a one-dimensional array to a two-dimensional array.

The inverse transform processing unit 78 applies an inverse transform to the inverse quantized transform coefficients. In some examples, the inverse transform processing unit 78 may determine an inverse transform based on signaling from the video encoder 20, or by inferring the transform from one or more coding characteristics such as block size, coding mode, or the like. In some examples, the inverse transform processing unit 78 may determine a transform to apply to the current block based on a signaled transform at the root node of a quadtree for an LCU including the current block. Alternatively, the transform may be signaled at the root of a TU quadtree for a leaf-node CU in the LCU quadtree. In some examples, the inverse transform processing unit 78 may apply a cascaded inverse transform, in which inverse transform processing unit 78 applies two or more inverse transforms to the transform coefficients of the current block being decoded.

The intra-prediction processing unit 74 may generate prediction data for a current block of a current frame based on a signaled intra-prediction mode and data from previously decoded blocks of the current frame.

The motion compensation unit 72 may retrieve the motion vector, motion prediction direction and reference index from the encoded bitstream. The reference prediction direction indicates whether the inter-prediction mode is uni-directional (e.g., a P frame) or bi-directional (a B frame). The reference index indicates which reference frame the candidate motion vector is based on.

Based on the retrieved motion prediction direction, reference frame index, and motion vector, the motion compensation unit produces a motion compensated block for the current portion. These motion compensated blocks essentially recreate the predictive block used to produce the residual data.

The motion compensation unit 72 may produce the motion compensated blocks, possibly performing interpolation based on interpolation filters. Identifiers for interpolation filters to be used for motion estimation with sub-pixel precision may be included in the syntax elements. The motion compensation unit 72 may use interpolation filters as used by the video encoder 20 during encoding of the video block to calculate interpolated values for sub-integer pixels of a reference block. The motion compensation unit 72 may determine the interpolation filters used by the video encoder 20 according to received syntax information and use the interpolation filters to produce predictive blocks.

Additionally, the motion compensation unit 72 and the intra-prediction processing unit 74, in an HEVC example, may use some of the syntax information (e.g., provided by a quadtree) to determine sizes of LCUs used to encode frame(s) of the encoded video sequence. The motion compensation unit 72 and the intra-prediction processing unit 74 may also use syntax information to determine split information that describes how each CU of a frame of the encoded video sequence is split (and likewise, how sub-CUs are split). The syntax information may also include modes indicating how each split is encoded (e.g., intra- or inter-prediction, and for intra-prediction an intra-prediction encoding mode), one or more reference frames (and/or reference lists containing identifiers for the reference frames) for each inter-encoded PU, and other information to decode the encoded video sequence.

The summer 80 combines the residual blocks with the corresponding prediction blocks generated by the motion compensation unit 72 or the intra-prediction processing unit 74 to form decoded blocks. If desired, a deblocking filter may also be applied to filter the decoded blocks in order to remove blockiness artifacts. The decoded video blocks are then stored in the reference frame buffer 82, which provides reference blocks for subsequent motion compensation and also produces decoded video for presentation on a display device (such as the display device 32 of FIG. 1).

Figure 9:
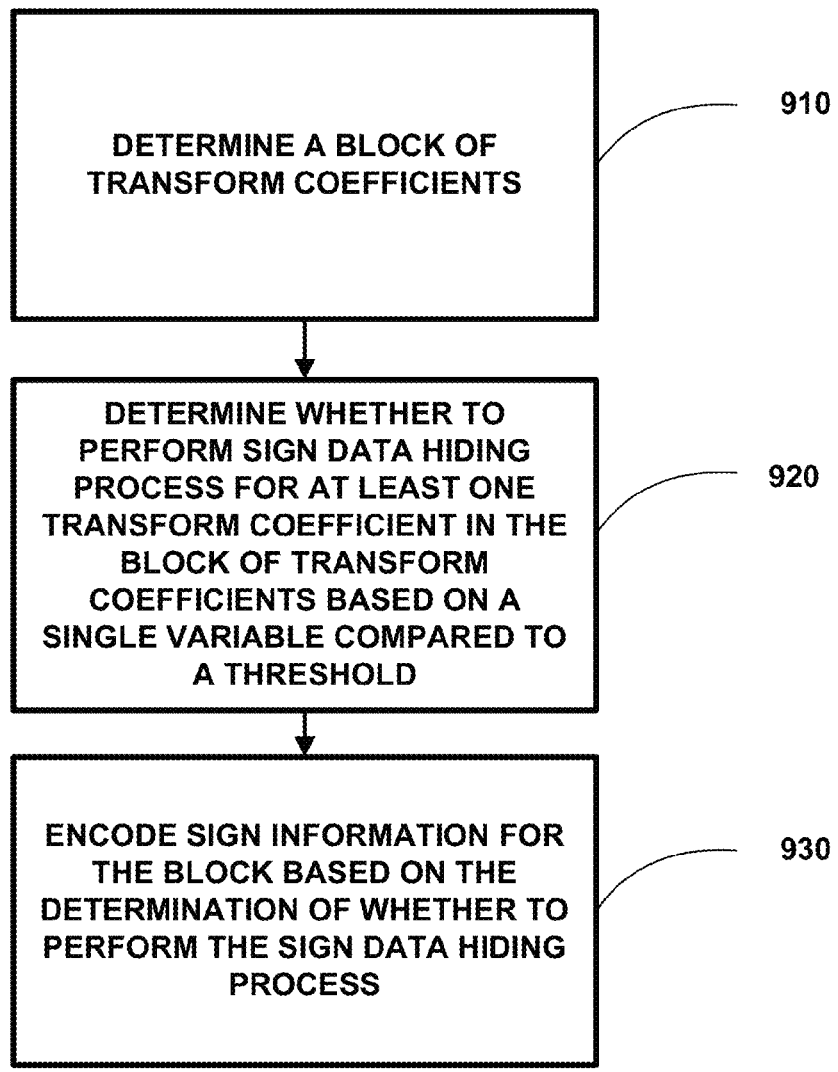
FIG. 9 is a flowchart showing an example video encoding method according to the techniques of this disclosure.

FIG. 9 is a flowchart showing an example video encoding method according to the techniques of this disclosure. The techniques of FIG. 9 may be carried out by one or more hardware units of video encoder 20. In one example, entropy encoding unit 56 may perform some of the techniques related to sign data hiding.

Initially, video encoder 20 may be configured to generate a block of transform coefficients (910). Entropy encoding unit 56 may be configured to determine whether to perform a sign data hiding process for at least one transform coefficient in the block of transform coefficients based on a single variable compared to a threshold (920). Entropy encoding unit 56 may be further configured to encode sign information for the block based on the determination of whether to perform the sign data hiding process (930).

In one example, the block of transform coefficients is a coefficient group. In this example, the single variable may be a position of a last non-zero coefficient in the coefficient group, wherein the last non-zero coefficient in the coefficient group is defined relative to a forward scanning order. In another example, the single variable is a number of non-zero coefficients in the coefficient group. In still another example, the single variable is a sum of absolute values of non-zero transform coefficients in the coefficient group.

In another example, the block of transform coefficients is a transform block. In this example, the single variable is a position of a last non-zero coefficient in a coefficient group in the transform block, wherein the coefficient group contains the last non-zero coefficient in the transform block.

In the example that the block of transform coefficients is a transform block, entropy encoding unit 56 may be further configured to determine a coefficient group of the transform block containing the last non-zero coefficient, perform the sign data hiding process on at least one transform coefficient in the coefficient group containing the last non-zero coefficient based on the single variable, and perform the sign data hiding process on at least one transform coefficient for all other coefficient groups in the transform block that are subsequent the coefficient group containing the last non-zero coefficient in a scanning order.

The sign data hiding process may be executed by entropy encoding unit 56 in several ways. In one example, entropy encoding unit 56 may be configured to perform the sign data hiding process on a first non-zero coefficient in the block. In another example, entropy encoding unit 56 may be configured to perform the sign data hiding process on a last non-zero coefficient in the block.

In still another example, entropy encoding unit 56 may be configured to perform the sign data hiding process on two or more non-zero coefficients in the block. The two or more non-zero coefficients include the first two non-zero coefficients, along a scanning order, in the block. In another example, the two or more non-zero coefficients include a first non-zero coefficient and a last non-zero coefficient, along a scanning order, in the block.

In one example, when hiding two sign values, entropy encoding unit 56 may be configured to encode a sign of a first transform coefficient in an absolute value of a level of the transform coefficients in the block, and encode a sign of a second transform coefficient in an absolute value of a level of the transform coefficients in the block right shifted by one. In another example, entropy encoding unit 56 may be configured to encode a sign of a first transform coefficient in a parity of a level of the transform coefficients in a first group of coefficients in the block, and encode a sign of a second transform coefficient in a parity of a level of transform coefficients in a second group of coefficients in the block.

Figure 10:
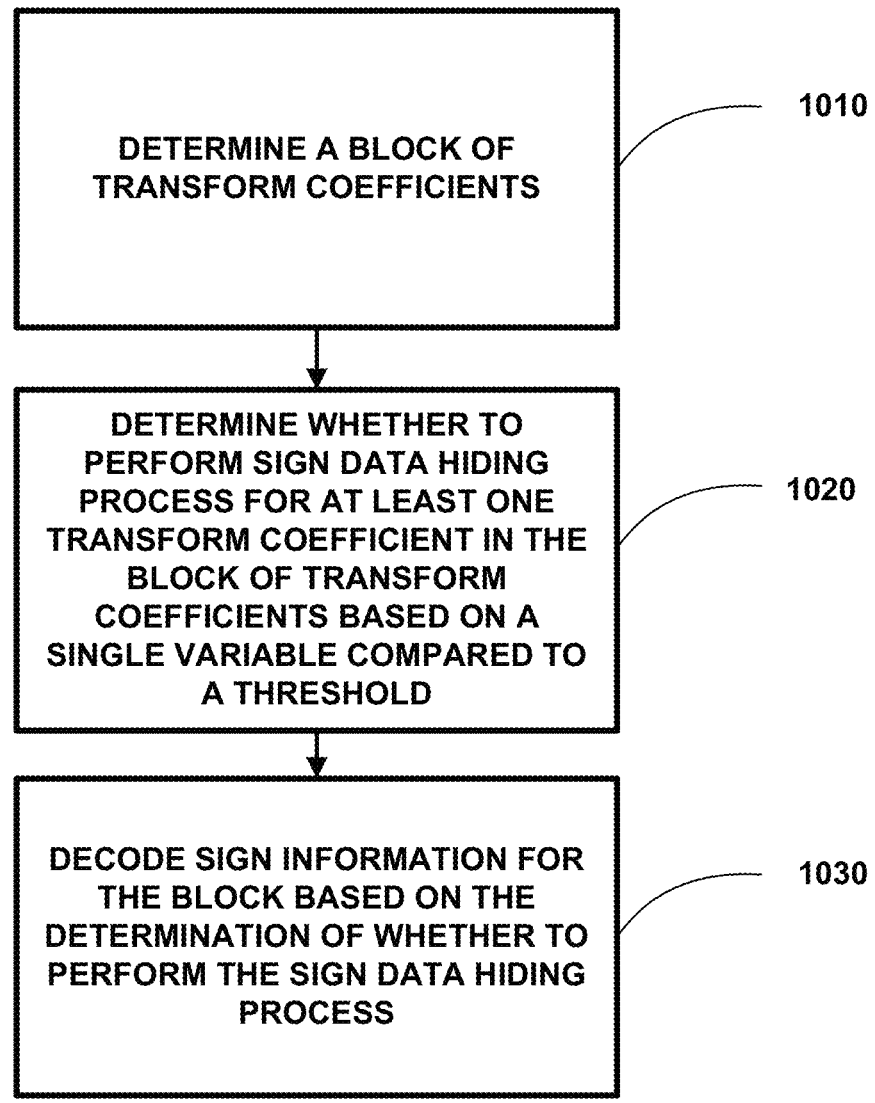
FIG. 10 is a flowchart showing an example video decoding method according to the techniques of this disclosure.

FIG. 10 is a flowchart showing an example video decoding method according to the techniques of this disclosure. The techniques of FIG. 10 may be carried out by one or more hardware units of video decoder 30. In one example, entropy decoding unit 70 may perform some of the techniques related to sign data hiding.

Initially, video decoder 30 may be configured to determine a block of transform coefficients (1010). Entropy decoding unit 70 may be configured to determine whether to perform a sign data hiding process for at least one transform coefficient in the block of transform coefficients based on a single variable compared to a threshold (1020). Entropy decoding unit 70 may be further configured to decode sign information for the block based on the determination of whether to perform the sign data hiding process (1030).

In one example, the block of transform coefficients is a coefficient group. In this example, the single variable may be a position of a last non-zero coefficient in the coefficient group, wherein the last non-zero coefficient in the coefficient group is defined relative to a forward scanning order. In another example, the single variable is a number of non-zero coefficients in the coefficient group. In still another example, the single variable is a sum of absolute values of non-zero transform coefficients in the coefficient group.

In another example, the block of transform coefficients is a transform block. In this example, the single variable is a position of a last non-zero coefficient in a coefficient group in the transform block, wherein the coefficient group contains the last non-zero coefficient in the transform block.

In the example that the block of transform coefficients is a transform block, entropy decoding unit 70 may be further configured to determine a coefficient group of the transform block containing the last non-zero coefficient, perform the sign data hiding process on at least one transform coefficient in the coefficient group containing the last non-zero coefficient based on the single variable, and perform the sign data hiding process on at least one transform coefficient for all other coefficient groups in the transform block that are subsequent the coefficient group containing the last non-zero coefficient in a scanning order.

The sign data hiding process may be executed by entropy decoding unit 70 in several ways. In one example, entropy decoding unit 70 may be configured to perform the sign data hiding process on a first non-zero coefficient in the block. In another example, entropy decoding unit 70 may be configured to perform the sign data hiding process on a last non-zero coefficient in the block.

In still another example, entropy decoding unit 70 may be configured to perform the sign data hiding process on two or more non-zero coefficients in the block. The two or more non-zero coefficients include the first two non-zero coefficients, along a scanning order, in the block. In another example, the two or more non-zero coefficients include a first non-zero coefficient and a last non-zero coefficient, along a scanning order, in the block.

In one example, when performing SDH for two sign values, entropy decoding unit 70 may be configured to decode a sign of a first transform coefficient in an absolute value of a level of the transform coefficients in the block, and decode a sign of a second transform coefficient in an absolute value of a level of the transform coefficients in the block right shifted by one. In another example, entropy decoding unit 70 may be configured to decode a sign of a first transform coefficient in a parity of a level of the transform coefficients in a first group of coefficients in the block, and decode a sign of a second transform coefficient in a parity of a level of transform coefficients in a second group of coefficients in the block.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for decoding video data, the method comprising:
   determining a block of transform coefficients, wherein the block of transform coefficients is one coefficient group of a plurality of coefficient groups of a transform block;
   determining whether to perform a sign data hiding process for a first transform coefficient in the one coefficient group based on a first variable compared to a first threshold;
   determining whether to perform a sign data hiding process for a second transform coefficient in the one coefficient group based on a second variable compared to a second threshold different from the first threshold;
   decoding sign information for the block based on the determination of whether to perform the sign data hiding process; and
   decoding the video data based on the transform coefficients.

2. The method of claim 1, wherein the first variable is a position of a last non-zero coefficient in the one coefficient group, and wherein the second variable is a position of a last non-zero coefficient in the one coefficient group.

3. The method of claim 2, wherein the last non-zero coefficient in the coefficient group is defined relative to a forward scanning order.

4. The method of claim 1, wherein the first variable is a number of non-zero coefficients in the one coefficient group, and wherein the second variable is a number of non-zero coefficients in the one coefficient group.

5. The method of claim 1, wherein the first variable is a sum of absolute values of non-zero transform coefficients in the one coefficient group.

6. The method of claim 1, further comprising:
   performing the sign data hiding process on a first non-zero coefficient in the block.

7. The method of claim 1, further comprising:
performing the sign data hiding process on a last non-zero coefficient in the block.

8. The method of claim 1, wherein the first transform coefficient and the second transform coefficient comprise the first two non-zero coefficients, along a scanning order, in the one coefficient group.

9. The method of claim 1, wherein the first transform coefficient and the second transform coefficient comprise a first non-zero coefficient and a last non-zero coefficient, respectively, along a scanning order, in the one coefficient group.

10. The method of claim 1, wherein performing the sign data hiding process includes decoding a sign of the first transform coefficient in an absolute value of a sum of the levels of the transform coefficients in the one coefficient group, and decoding a sign of the second transform coefficient in the absolute value of the sum of the levels of the transform coefficients in the one coefficient group right shifted by one bit.

11. The method of claim 1, wherein performing the sign data hiding process includes decoding a sign of the first transform coefficient in a parity of a sum of the levels of the transform coefficients in a first group of coefficients in the block, and decoding a sign of the second transform coefficient in a parity of a sum of the levels of transform coefficients in a second group of coefficients in the block.

12. A method for encoding video data, the method comprising:
generating a block of transform coefficients, wherein the block of transform coefficients is one coefficient group of a plurality of coefficient groups of a transform block;
determining whether to perform a sign data hiding process for a first transform coefficient in the one coefficient group based on a first variable compared to a first threshold;
determining whether to perform a sign data hiding process for a second transform coefficient in the one coefficient group based on a second variable compared to a second threshold different from the first threshold;
encoding sign information for the block based on the determination of whether to perform the sign data hiding process; and
encoding the video data based on the transform coefficients.

13. The method of claim 12, wherein the first variable is a position of a last non-zero coefficient in the one coefficient group, and wherein the second variable is a position of a last non-zero coefficient in the one coefficient group.

14. The method of claim 13, wherein the last non-zero coefficient in the coefficient group is defined relative to a forward scanning order.

15. The method of claim 12, wherein the first variable is a number of non-zero coefficients in the one coefficient group, and wherein the second variable is a number of non-zero coefficients in the one coefficient group.

16. The method of claim 12, wherein the first variable is a sum of absolute values of non-zero transform coefficients in the one coefficient group.

17. The method of claim 12, further comprising:
performing the sign data hiding process on a first non-zero coefficient in the block.

18. The method of claim 12, further comprising:
performing the sign data hiding process on a last non-zero coefficient in the block.

19. The method of claim 12, wherein the first transform coefficient and the second transform coefficient comprise the first two non-zero coefficients, along a scanning order, in the one coefficient group.

20. The method of claim 12, wherein the first transform coefficient and the second transform coefficient comprise a first non-zero coefficient and a last non-zero coefficient, respectively, along a scanning order, in the one coefficient group.

21. The method of claim 12, wherein performing the sign data hiding process includes encoding a sign of the first transform coefficient in an absolute value of a sum of the levels of the transform coefficients in the one coefficient group, and encoding a sign of the second transform coefficient in the absolute value of the sum of the levels of the transform coefficients in the one coefficient group right shifted by one bit.

22. The method of claim 12, wherein performing the sign data hiding process includes encoding a sign of the first transform coefficient in a parity of a sum of the levels of the transform coefficients in a first group of coefficients in the block, and encoding a sign of the second transform coefficient in a parity of a sum of the levels of transform coefficients in a second group of coefficients in the block.

23. An apparatus configured to code video data, the apparatus comprising:
a memory configured to store a transform block of transform coefficients; and
a video coding processor configured to:
determine a block of transform coefficients, wherein the block of transform coefficients is one coefficient group of a plurality of coefficient groups of a transform block;
determine whether to perform a sign data hiding process for a first transform coefficient in the one coefficient group based on a first variable compared to a first threshold;
determine whether to perform a sign data hiding process for a second transform coefficient in the one coefficient group based on a second variable compared to a second threshold different from the first threshold;
code sign information for the block based on the determination of whether to perform the sign data hiding process; and
code the video data based on the transform coefficients.

24. The apparatus of claim 23, wherein the first variable is a position of a last non-zero coefficient in the one coefficient group, and wherein the second variable is a position of a last non-zero coefficient in the one coefficient group.

25. The apparatus of claim 24, wherein the last non-zero coefficient in the coefficient group is defined relative to a forward scanning order.

26. The apparatus of claim 23, wherein the first variable is a number of non-zero coefficients in the one coefficient group, and wherein the second variable is a number of non-zero coefficients in the one coefficient group.

27. The apparatus of claim 23, wherein the first variable is a sum of absolute values of non-zero transform coefficients in the one coefficient group.

28. The apparatus of claim 23, wherein the video coding processor is further configured to:
perform the sign data hiding process on a first non-zero coefficient in the block.

29. The apparatus of claim 23, wherein the video coding processor is further configured to:
perform the sign data hiding process on a last non-zero coefficient in the block.

30. The apparatus of claim 23, wherein the first transform coefficient and the second transform coefficient comprise the first two non-zero coefficients, along a scanning order, in the one coefficient group.

31. The apparatus of claim 23, wherein the first transform coefficient and the second transform coefficient comprise a first non-zero coefficient and a last non-zero coefficient, respectively, along a scanning order, in the one coefficient group.

32. The apparatus of claim 23, wherein the video coding processor is further configured:
code a sign of the first transform coefficient in an absolute value of a sum of the levels of the transform coefficients in the one coefficient group; and
code a sign of the second transform coefficient in the absolute value of the sum of the levels of the transform coefficients in the one coefficient group right shifted by one bit.

33. The apparatus of claim 23, wherein the video coding processor is further configured to:
code a sign of the first transform coefficient in a parity of a sum of the levels of the transform coefficients in a first group of coefficients in the block; and
code a sign of the second transform coefficient in a parity of a sum of the levels of transform coefficients in a second group of coefficients in the block.

34. The apparatus of claim 23, wherein the video coding processor is a video decoder, the video decoder further configured to:
receive the threshold in one or more of a sequence parameter set, a picture parameter set, an adaptation parameter set, and a slice header.

35. The apparatus of claim 23, wherein the video coding processor is a video encoder, the video encoder further configured to:
signal the threshold in one or more of a sequence parameter set, a picture parameter set, an adaptation parameter set, and a slice header.

36. An apparatus configured to code video data, the apparatus comprising:
means for determining a block of transform coefficients, wherein the block of transform coefficients is one coefficient group of a plurality of coefficient groups of a transform block;
means for determining whether to perform a sign data hiding process for a first transform coefficient in the one coefficient group based on a first variable compared to a first threshold;
means for determining whether to perform a sign data hiding process for a second transform coefficient in the one coefficient group based on a second variable compared to a second threshold different from the first threshold;
means for coding sign information for the block based on the determination of whether to perform the sign data hiding process; and
means for coding the video data based on the transform coefficients.

37. The apparatus of claim 36, wherein the first variable is a position of a last non-zero coefficient in the one coefficient group, and wherein the second variable is a position of a last non-zero coefficient in the one coefficient group.

38. A non-transitory computer-readable storage medium storing instructions that, when executed, cause one or more processors of a device configured to code video data to:
determine a block of transform coefficients, wherein the block of transform coefficients is one coefficient group of a plurality of coefficient groups of a transform block;
determine whether to perform a sign data hiding process for a first transform coefficient in the one coefficient group based on a first variable compared to a first threshold;
determine whether to perform a sign data hiding process for a second transform coefficient in the one coefficient group based on a second variable compared to a second threshold different from the first threshold;
code sign information for the block based on the determination of whether to perform the sign data hiding process; and
code the video data based on the transform coefficients.

39. The non-transitory computer-readable storage medium of claim 38, wherein the first variable is a position of a last non-zero coefficient in the one coefficient group, and wherein the second variable is a position of a last non-zero coefficient in the one coefficient group.

\* \* \* \* \*